US012355514B2

(12) United States Patent
Sun et al.

(10) Patent No.: US 12,355,514 B2
(45) Date of Patent: *Jul. 8, 2025

(54) MIMO ENHANCEMENT CAPABILITY DESIGN

(71) Applicant: Apple Inc., Cupertino, CA (US)

(72) Inventors: Haitong Sun, Cupertino, CA (US); Yushu Zhang, Beijing (CN); Wei Zeng, Saratoga, CA (US); Dawei Zhang, Saratoga, CA (US); Yuchul Kim, San Jose, CA (US); Hong He, San Jose, CA (US); Weidong Yang, San Diego, CA (US); Chunhai Yao, Beijing (CN); Chunxuan Ye, San Diego, CA (US); Oghenekome Oteri, San Diego, CA (US); Ismael Gutierrez Gonzalez, San Jose, CA (US); Ghaith N Hattab, Santa Clara, CA (US); Jie Cui, San Jose, CA (US); Yang Tang, San Jose, CA (US); Haijing Hu, Los Gatos, CA (US); Fangli Xu, Beijing (CN); Zhibin Wu, Los Altos, CA (US); Yuqin Chen, Beijing (CN); Yeong-Sun Hwang, Germering (DE)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/523,273

(22) Filed: Nov. 29, 2023

(65) Prior Publication Data

US 2024/0097747 A1    Mar. 21, 2024

Related U.S. Application Data

(63) Continuation of application No. 17/833,502, filed on Jun. 6, 2022, now Pat. No. 11,855,715, which is a
(Continued)

(51) Int. Cl.
H04B 7/0413    (2017.01)
H04L 1/1829    (2023.01)
(Continued)

(52) U.S. Cl.
CPC ......... H04B 7/0413 (2013.01); H04L 1/1854 (2013.01); H04L 5/0044 (2013.01);
(Continued)

(58) Field of Classification Search
CPC ... H04L 5/0053; H04L 5/0094; H04L 5/0048; H04L 5/0044; H04L 5/001; H04L 5/0023;
(Continued)

(56) References Cited

U.S. PATENT DOCUMENTS 11,855,715 B2 * 12/2023 Sun ................ H04B 7/0413
2019/0312698 A1   10/2019 Akkarakaran
(Continued)

FOREIGN PATENT DOCUMENTS

CN    10383874     10/2019
CN    110731112    1/2020
(Continued)

OTHER PUBLICATIONS

International Search Report and Written Opinion for PCT/CN2020/074912; Nov. 17, 2020.
(Continued)

Primary Examiner — Eva Y Puente
(74) Attorney, Agent, or Firm — Kowert, Hood, Munyon, Rankin & Goetzel, P.C.

(57) ABSTRACT

Apparatuses, systems, and methods for multi-TRP by a UE, including out of order delivery of PDSCH, PUSCH, and/or DL ACK/NACK. The UE may receive, from a base station, a configuration that may include multiple control resource set (CORESET) pools and each CORESET pool may be associated with an index value. The UE may determine that
(Continued)

at least two DCIs of the multiple DCIs end at a common symbol and determine, based on one or more predetermined rules, when the UE may be scheduled to receive PDSCHs, transmit PUSCHs, and/or transmit ACK/NACKs from CORESETs associated with the at least two DCIs.

20 Claims, 15 Drawing Sheets

Related U.S. Application Data continuation of application No. 17/267,603, filed as application No. PCT/CN2020/074912 on Feb. 12, 2020, now Pat. No. 11,356,151.

(51) Int. Cl.
*H04L 5/00* (2006.01)
*H04W 72/23* (2023.01)
*H04W 92/18* (2009.01)

(52) U.S. Cl.
CPC .......... *H04L 5/0053* (2013.01); *H04L 5/0094* (2013.01); *H04W 72/23* (2023.01); *H04W 92/18* (2013.01)

(58) Field of Classification Search
CPC ... H04L 5/0051; H04L 1/1812; H04B 7/0695; H04B 7/088; H04B 7/024; H04B 7/06968; H04B 7/022; H04B 7/06964; H04B 7/06952; H04B 7/0626; H04W 72/23; H04W 72/1268; H04W 72/0446; H04W 72/0453; H04W 72/21; H04W 72/12; H04W 72/232
USPC ...................................................... 375/262
See application file for complete search history.

(56) References Cited

U.S. PATENT DOCUMENTS

| | | | |
|---|---|---|---|
| 2020/0008231 A1 | 1/2020 | Vilaipornsawai | |
| 2020/0112414 A1* | 4/2020 | Khoshnevisan | ...... H04L 5/0035 |
| 2020/0305168 A1* | 9/2020 | Liou | ...................... H04W 76/11 |
| 2020/0396744 A1* | 12/2020 | Xiong | .................... H04B 7/088 |
| 2021/0014931 A1 | 1/2021 | Noh | |
| 2021/0274546 A1 | 9/2021 | Kung | |
| 2021/0314982 A1* | 10/2021 | Panteleev | ............. H04L 5/0094 |
| 2021/0345360 A1 | 11/2021 | Yeo | |
| 2021/0378004 A1 | 12/2021 | Cirik | |
| 2022/0417960 A1* | 12/2022 | Yang | ................. H04W 72/1263 |

FOREIGN PATENT DOCUMENTS

| | | |
|---|---|---|
| CN | 110741587 | 1/2020 |
| WO | 2019031850 | 2/2019 |
| WO | 2019139513 | 7/2019 |

OTHER PUBLICATIONS

OPPO, Enhancements on multi-TRP and multi-pane! transmission, 3GPP TSG RAN WG Meeting #99, R1-1911843, Nov. 22, 2019.
Extended European Search Report for EP Patent Application No. 20848783.5; Nov. 24, 2021.
Qualcomm Incorporated "Multi-TRP Enhancements"; 3GPP TSG-RAN WG1 Meeting #99 R1-1912967; Nov. 18, 2019.
Huawei et al. "Ehanchments on multi-TRP/panel transmission"; 3GPP TSG RAN WG1 Meeting #99 R1-1911902; Nov. 18, 2019.
Huawei et al. "Ehanchments on multi-TRP/panel transmission"; 3GPP RSG RAN WG1 #97 R1-1906029; May 13, 2019.
AT&T et al. "RAN1 UE features list for Rel-16 NR"; 3GPP TSG RAN WG1 98bis R1-1911751; Oct. 18, 2019.
Office Action for CN Patent Application No. 202080004490; Apr. 15, 2023.
MediaTek Inc. "Views on NR UE Capability List"; 3GP TSG RAN Meeting #81 RP-181863; Sep. 10, 2018.

* cited by examiner

MIMO ENHANCEMENT CAPABILITY DESIGN

PRIORITY DATA

This application is a continuation of U.S. patent application Ser. No. 17/833,502, titled "MIMO Enhancement Capability Design", filed Jun. 6, 2022, which is a continuation of U.S. patent application Ser. No. 17/267,603, titled "MIMO Enhancement Capability Design", filed Feb. 10, 2021, which was the National Stage of International Application No. PCT/CN2020/074912, filed Feb. 12, 2020, each of which is hereby incorporated by reference in its entirety as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

FIELD

The present application relates to wireless devices, and more particularly to apparatuses, systems, and methods for multiple transmission and reception (multi-TRP) by a user equipment device (UE), including out of order delivery of PDSCH, PUSCH, and/or DL ACK/NACK.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from medium access control (MAC) and higher layers. LTE also defines a number of physical layer channels for the uplink (UL).

For example, LTE defines a Physical Downlink Shared Channel (PDSCH) as a DL transport channel. The PDSCH is the main data-bearing channel allocated to users on a dynamic and opportunistic basis. The PDSCH carries data in Transport Blocks (TB) corresponding to a MAC protocol data unit (PDU), passed from the MAC layer to the physical (PHY) layer once per Transmission Time Interval (TTI). The PDSCH is also used to transmit broadcast information such as System Information Blocks (SIB) and paging messages.

As another example, LTE defines a Physical Downlink Control Channel (PDCCH) as a DL control channel that carries the resource assignment for UEs that are contained in a Downlink Control Information (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Additionally, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of higher throughputs possible at higher frequencies.

SUMMARY

Embodiments relate to apparatuses, systems, and methods multiple transmission and reception (multi-TRP) by a user equipment device (UE), including out of order delivery of PDSCH, PUSCH, and/or DL ACK/NACK.

In some embodiments, a wireless device, e.g., such as a user equipment device (UE), may be configured to receive, from a base station, a configuration that may include multiple control resource set (CORESET) pools. In some embodiments, each CORESET pool may be associated with an index value, e.g., a CORESETPool index. The UE may be configured to determine that at least two DCIs of the multiple DCIs end at a common symbol and determine, based on one or more predetermined rules, when the UE may be scheduled to receive physical downlink control channels (PDSCHs), transmit physical uplink control channels (PUSCHs), and/or transmit acknowledgments/negative acknowledgments (ACK/NACKs) from CORESETs associated with the at least two DCIs. In some embodiments, the UE may determine a possible relationship between the PDSCHs associated with the at least 2 DCIs based on a first predetermined rule, e.g., an earliest possible starting/ending symbol of one PDSCH relative to another PDSCH. In some embodiments, the first predetermined rule may include at least one of no overlap between PDSCHs (e.g., a starting symbol of one PDSCH does not occur until after an ending symbol of another PDSCH) or at least partial overlap between PDSCHs (e.g., a starting symbol of one PDSCH occurs prior to an ending symbol of another PDSCH). In some embodiments, the UE may determine a possible relationship between the PUSCHs associated with the at least 2 DCIs based on a second predetermined rule, e.g., an earliest possible starting/ending symbol of one PUSCH relative to another PUSCH. In some embodiments, the second predetermined rule may include at least one of no overlap between PUSCHs (e.g., a starting symbol of one PUSCH does not occur until after an ending symbol of another PUSCH) or at least partial overlap between PUSCHs (e.g., a starting symbol of one PUSCH occurs prior to an ending symbol of another PUSCH). In some embodiments, the UE may determine a possible relationship between ACK/NACKS for PDSCHs associated with the at least 2 DCIs based on a third predetermined rule.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
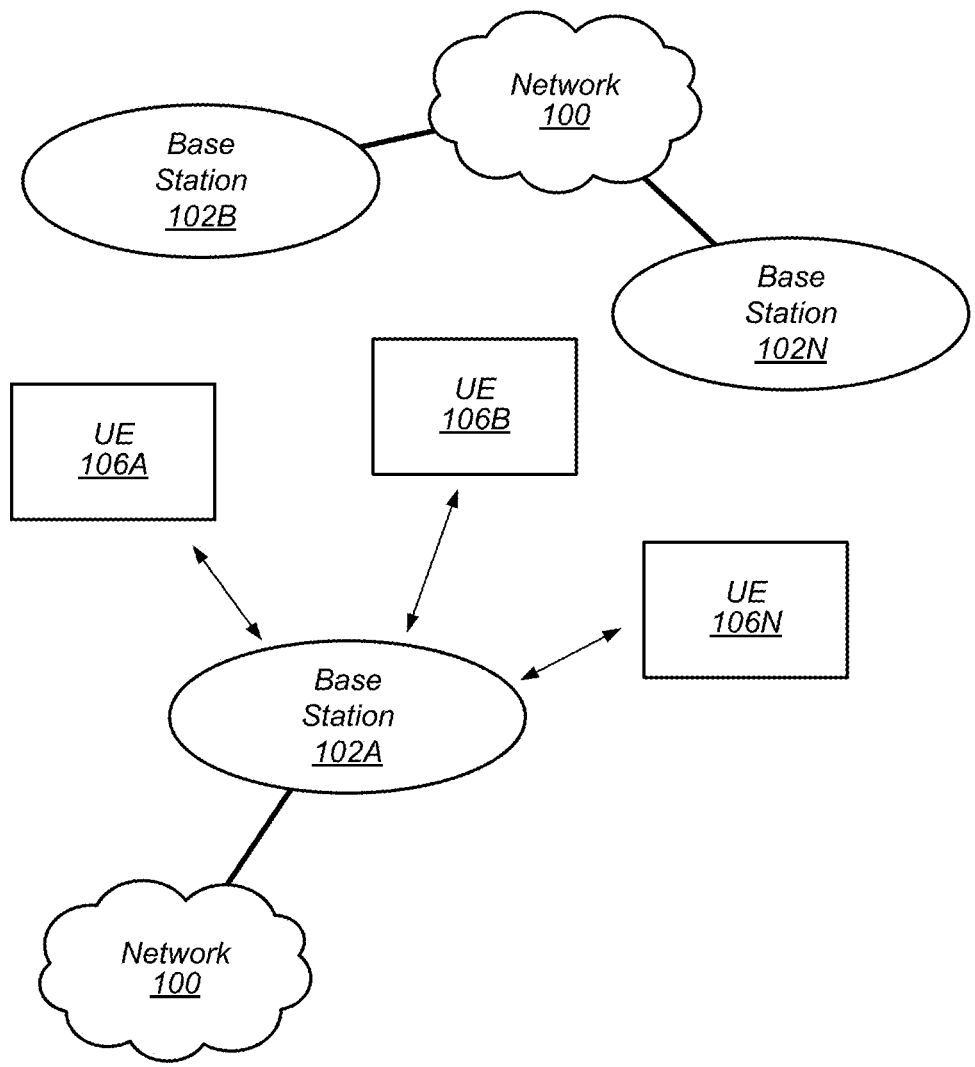
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
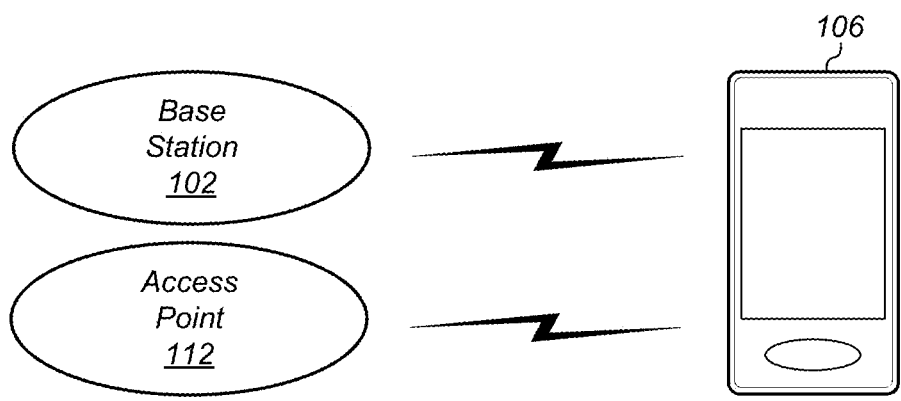
FIG. 1B illustrates an example of a base station (BS) and an access point in communication with a user equipment (UE) device according to some embodiments.

FIGS. 1A and 1B—Communication Systems

FIG. 1A illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing) Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
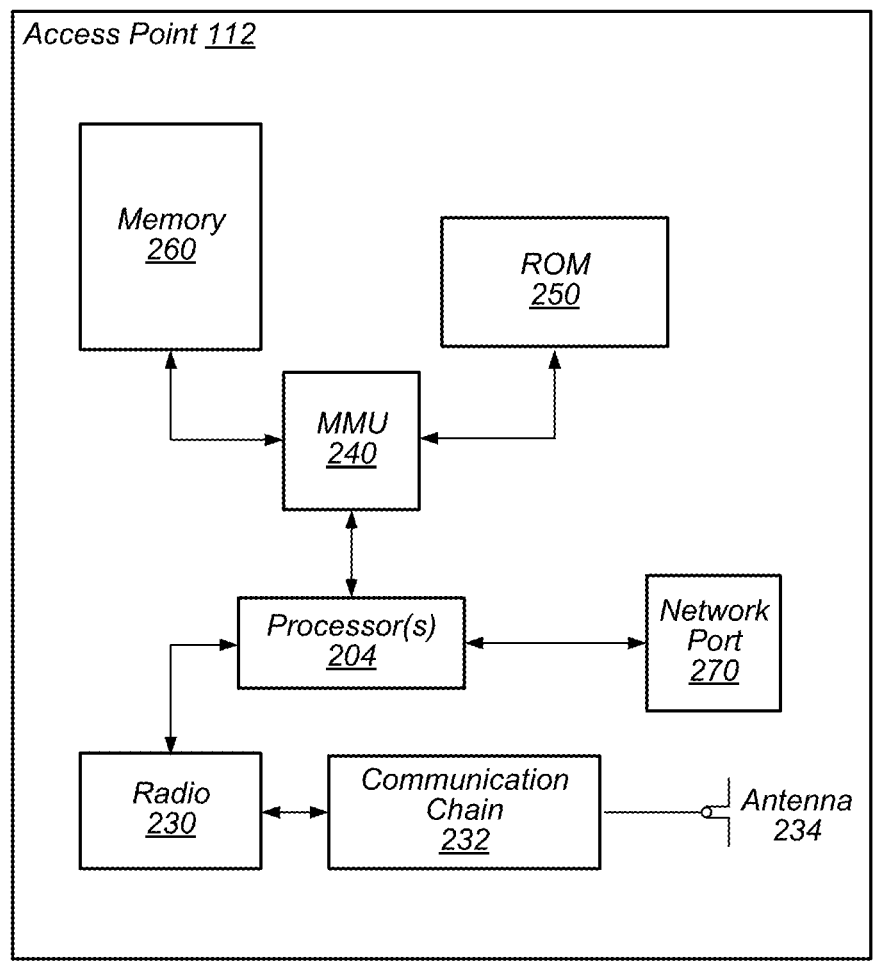
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system.

As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for multi-TRP by a UE, including out of order delivery of PDSCH, PUSCH, and/or DL ACK/NACK as further described herein.

Figure 3:
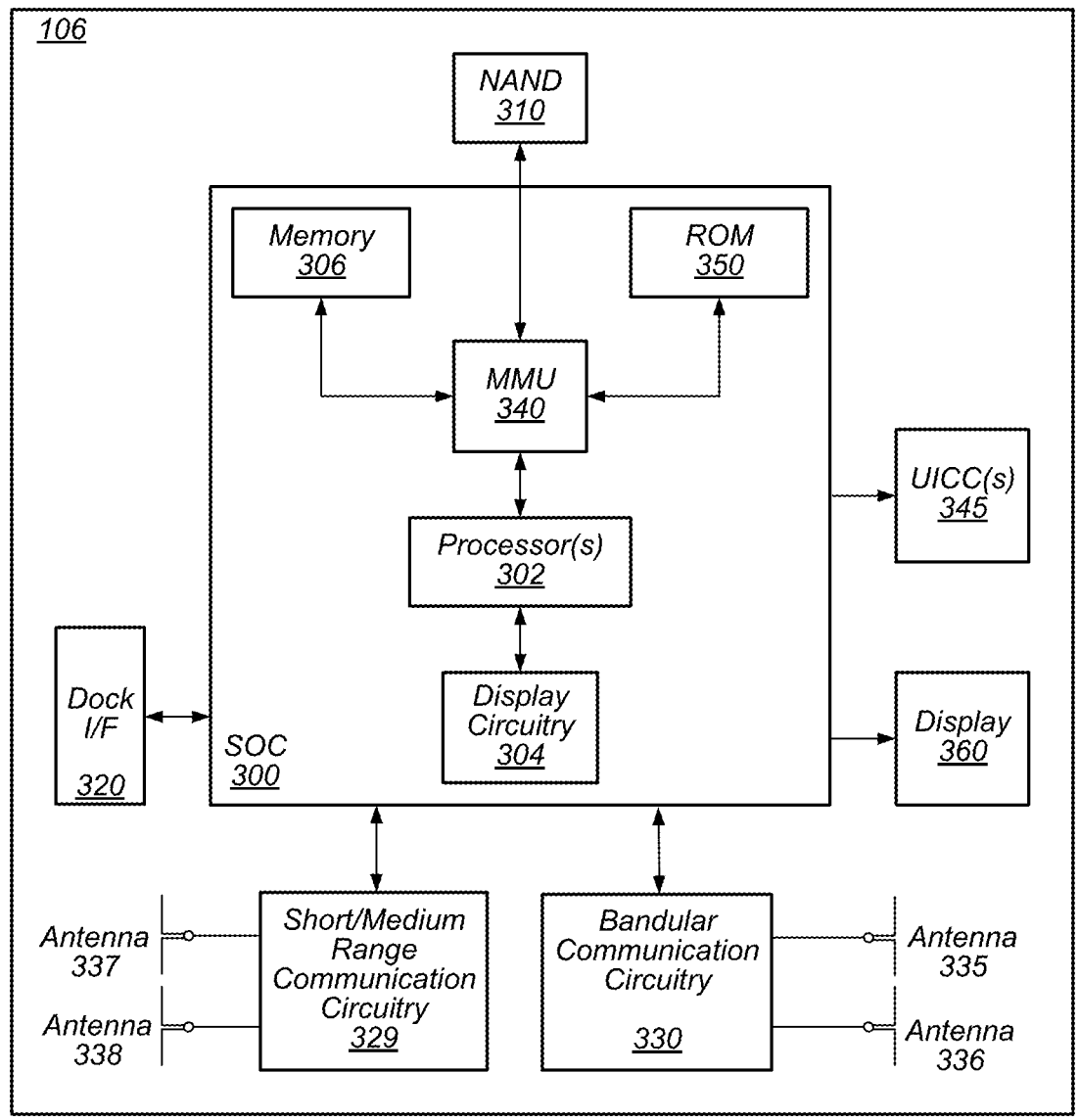
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector OF 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for multi-TRP by a UE, including out of order delivery of PDSCH, PUSCH, and/or DL ACK/NACK as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 4:
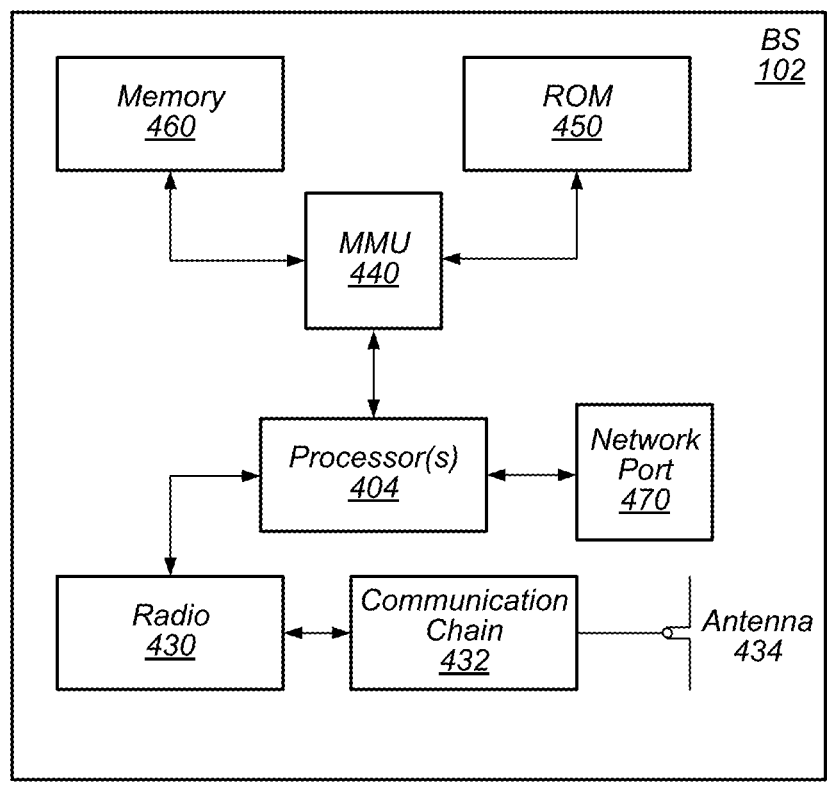
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
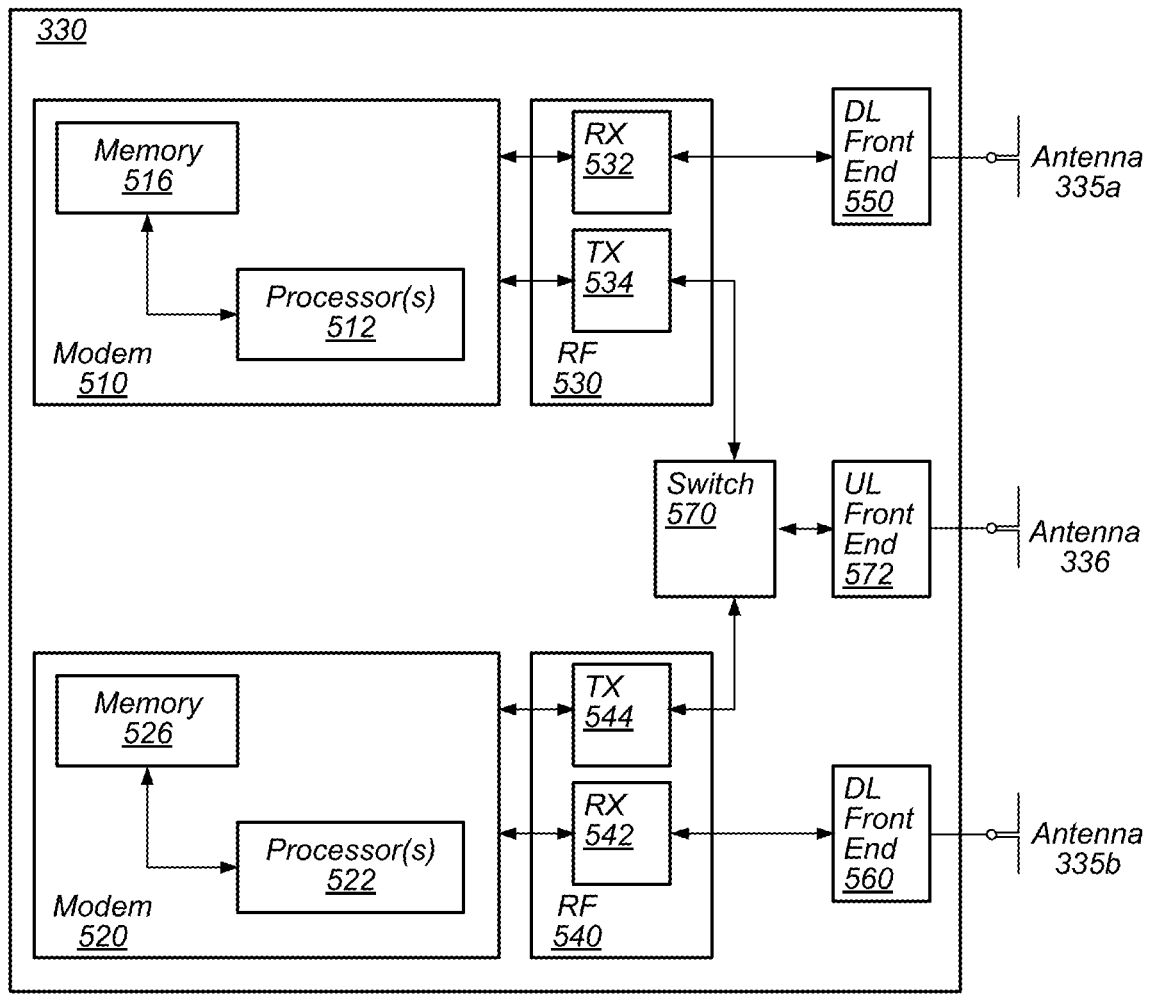
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572) Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods for multi-TRP by a UE, including out of order delivery of PDSCH, PUSCH, and/or DL ACK/NACK as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
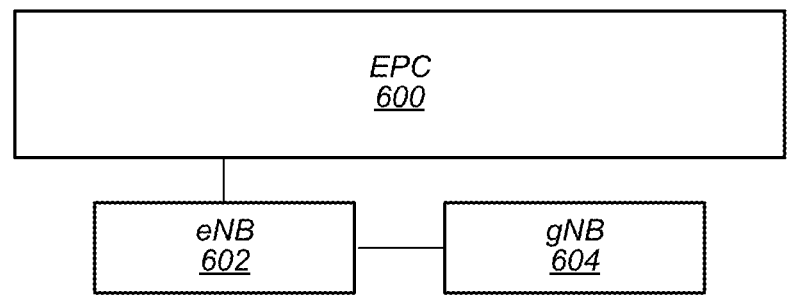
FIG. 6A illustrates an example of connections between an EPC network, an LTE base station (eNB), and a 5G NR base station (gNB).
Figure 6B:
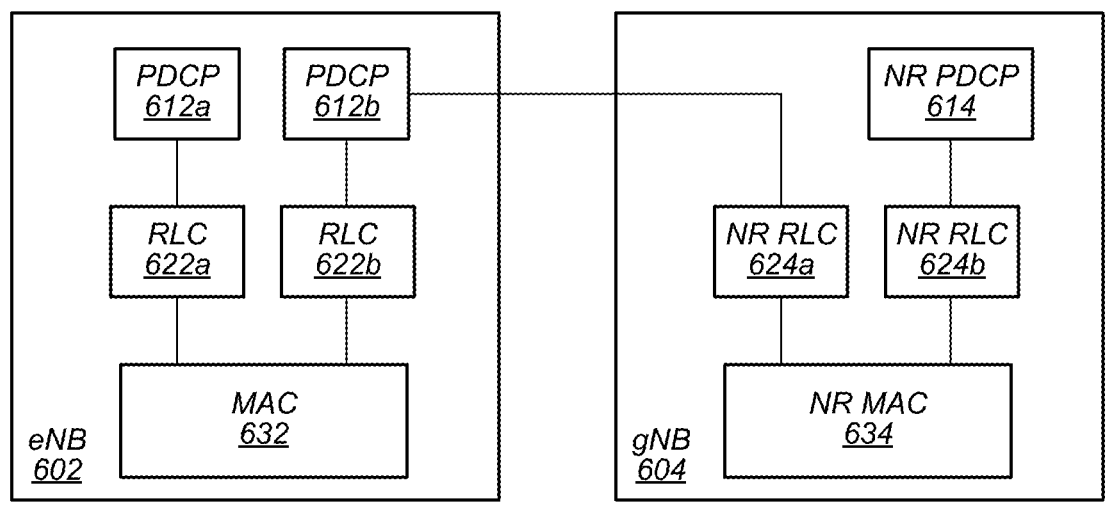
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer with EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking with Wi-Fi

Figure 7A:
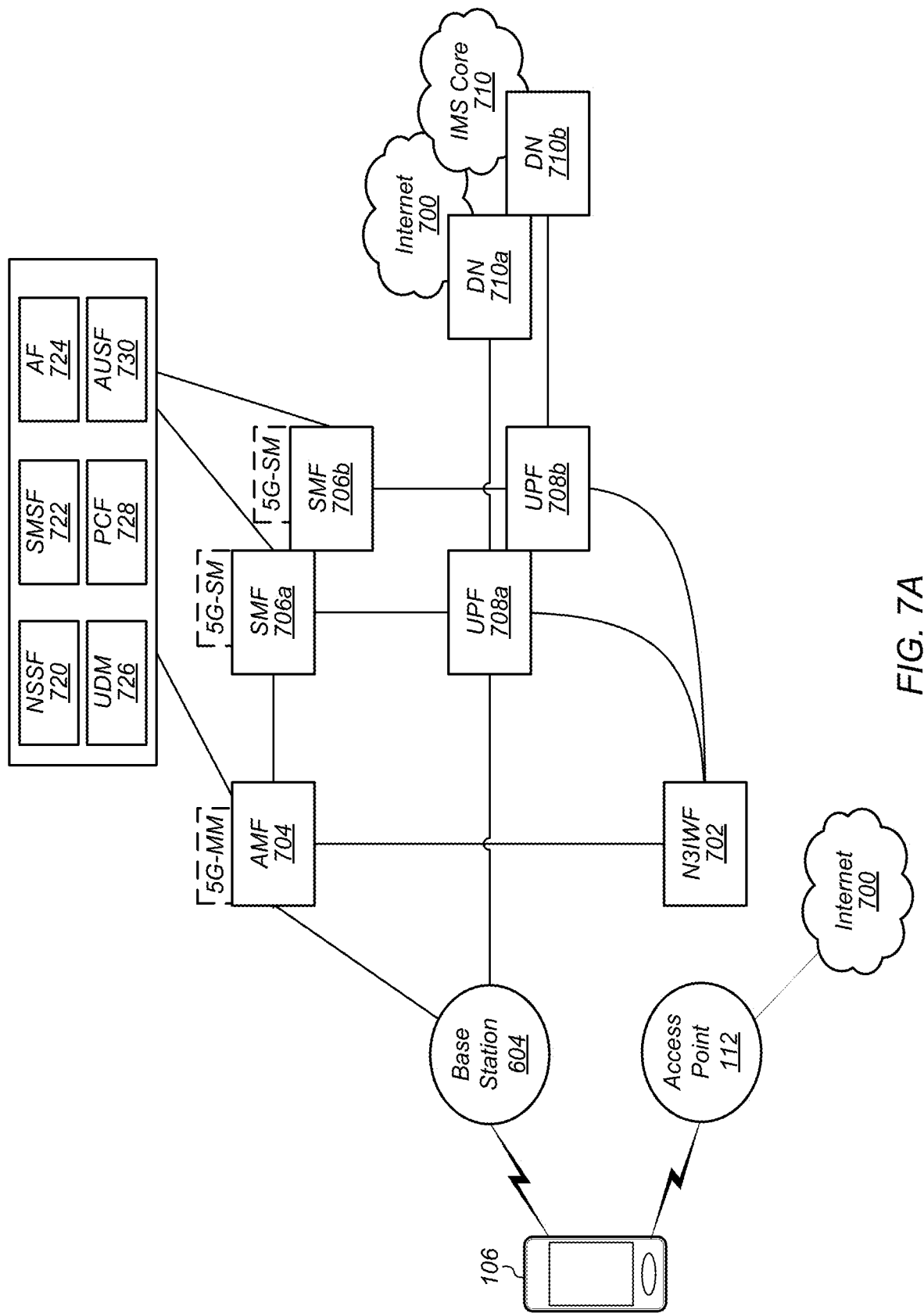
FIG. 7A illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706a. Further, the gNB 604 may in communication with (or connected to) a user plane function (UPF) 708a that may also be communication with the SMF 706a Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Figure 7B:
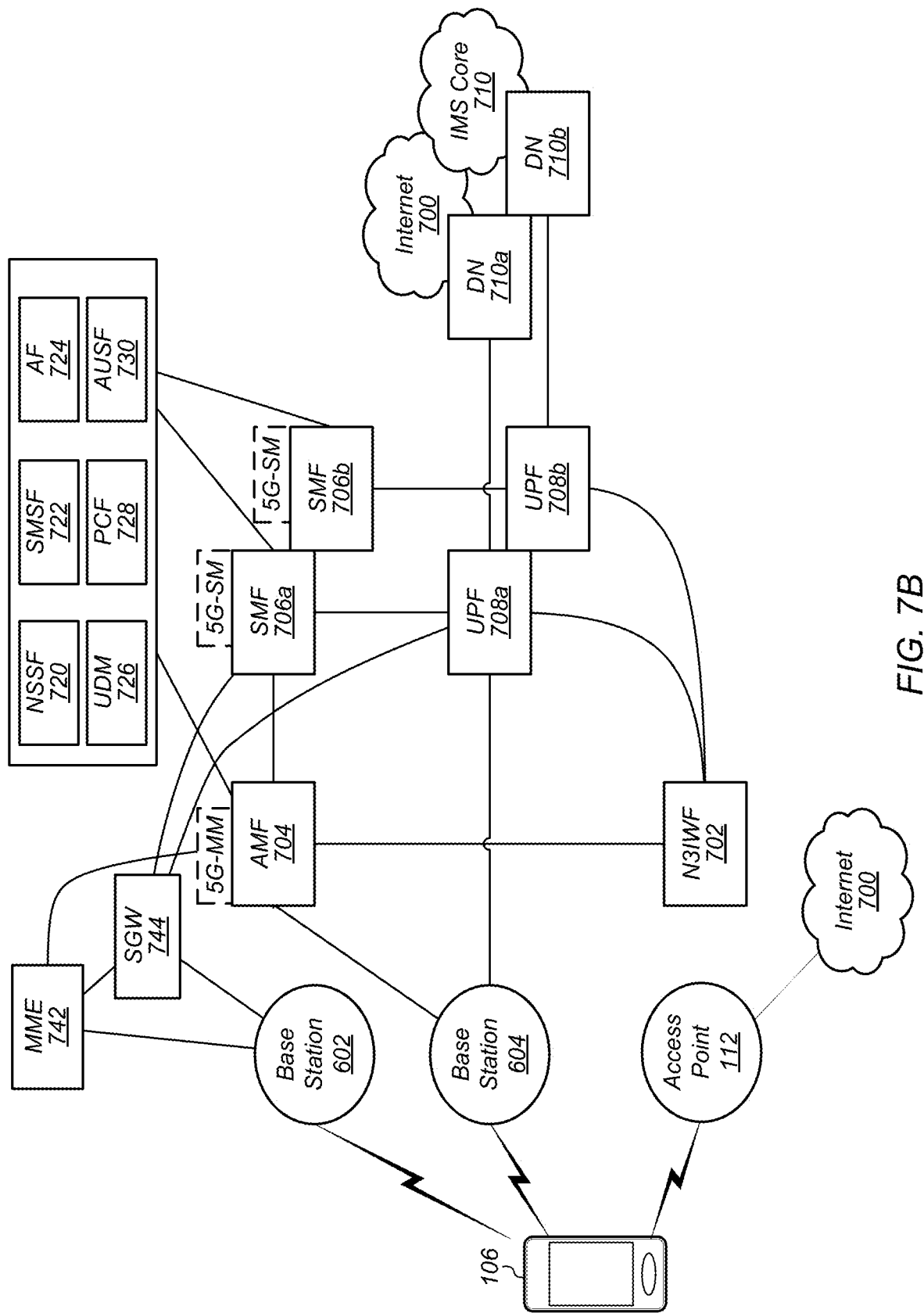
FIG. 7B illustrates an example of a 5G network architecture that incorporates both dual 3GPP (e.g., LTE and 5G NR) access and non-3GPP access to the 5G CN, according to some embodiments.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706a and the UPF 708a. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF706a and the SMF 706b of the 5G CN. The AMF 706 may be connected to (or in communication with) the SMF 706a. Further, the gNB 604 may in communication with (or connected to) the UPF 708a that may also be communication with the SMF 706a Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may be configured for multi-TRP by a UE, including out of order delivery of PDSCH, PUSCH, and/or DL ACK/NACK, e.g., as further described herein.

Figure 8:
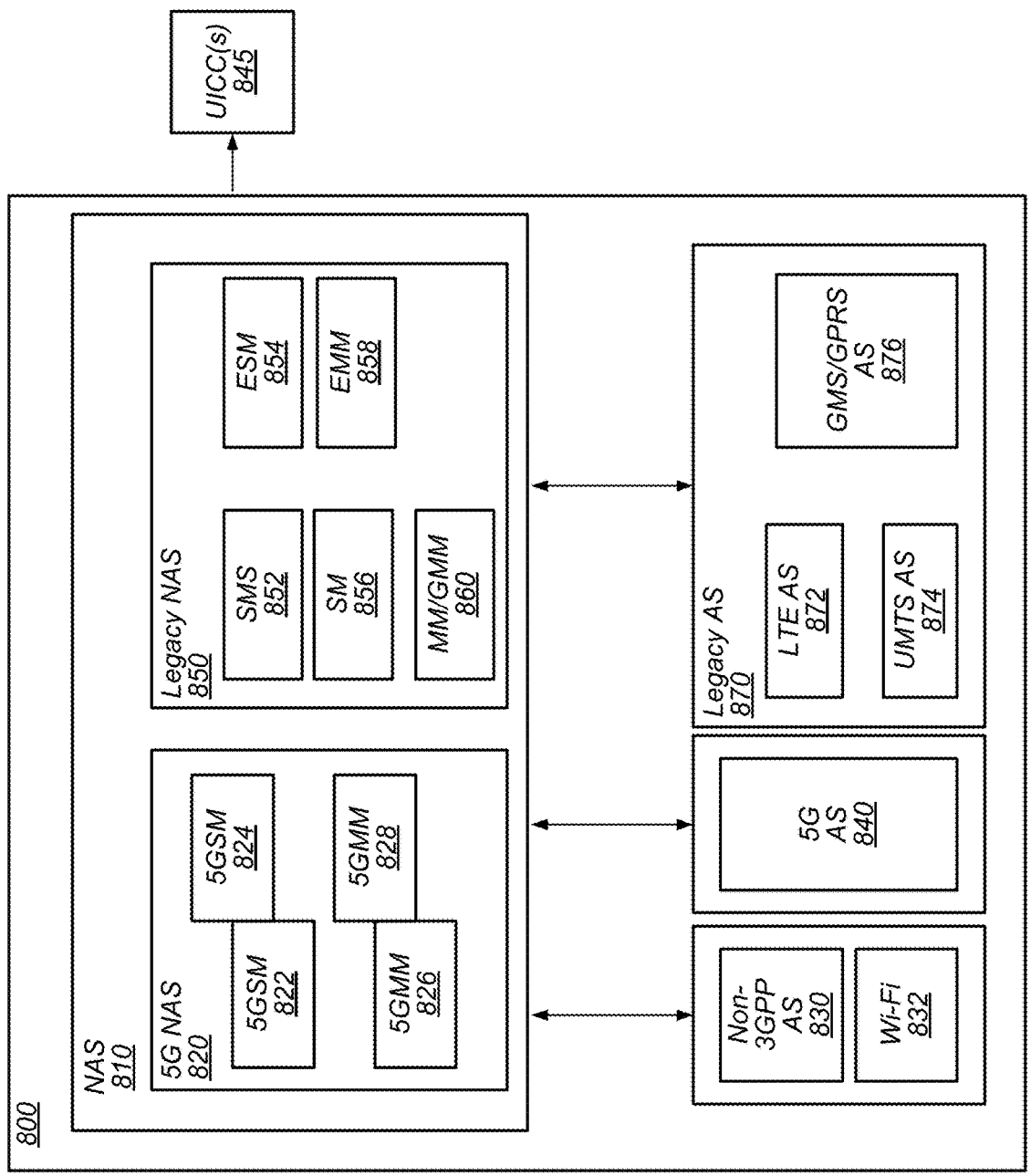
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods for multi-TRP by a UE, including out of order delivery of PDSCH, PUSCH, and/or DL ACK/NACK, e.g., as further described herein.

Multi-TRP

In current implementations, out of order delivery of a physical downlink shared channel (PDSCH), a physical uplink shared channel (PUSCH), and a downlink (DL) acknowledgment/negative acknowledgement (ACK/NACK) are prohibited. In particular, with regards to PDSCH, current implementations of the 3GPP standard (e.g., such as Release 15) state that "[f]or any two HARQ process IDs in a given scheduled cell, if the UE is scheduled to start receiving a first PDSCH starting in symbol j by a PDCCH ending in symbol i, the UE is not expected to be scheduled to receive a PDSCH starting earlier than the end of the first PDSCH with a PDCCH that ends later than symbol i. Similarly, with regards to PUSCH, current implementations of the 3GPP standard (e.g., such as Release 15) state that "[f]or any two HARQ process IDs in a given scheduled cell, if the UE is scheduled to start a first PUSCH transmission starting in symbol j by a PDCCH ending in symbol i, the UE is not expected to be scheduled to transmit a PUSCH starting earlier than the first PUSCH with a PDCCH that ends later than symbol i. Additionally, with regards to DL ACK/NACK, current implementations of the 3GPP standard (e.g., such as Release 15) state that "[i]n a give scheduled cell, the UE is not expected to receive a first PDSCH in slot i, with the corresponding HARQ ACK assigned to be transmitted in slot j, and a second PDSCH starting later than the first PDSCH with its corresponding HARQ-ACK assigned to be transmitted before slot j.

However, current implementations of MIMO (e.g., Release 15) support out of order delivery, but it is an optional feature for the UE. Additionally, multi-DCI design of MIMO allows two DCI to end at the same symbol. In other words, there may be multiple control resource set (CORESET) pools (e.g., CORESETPool).

Figure 9:
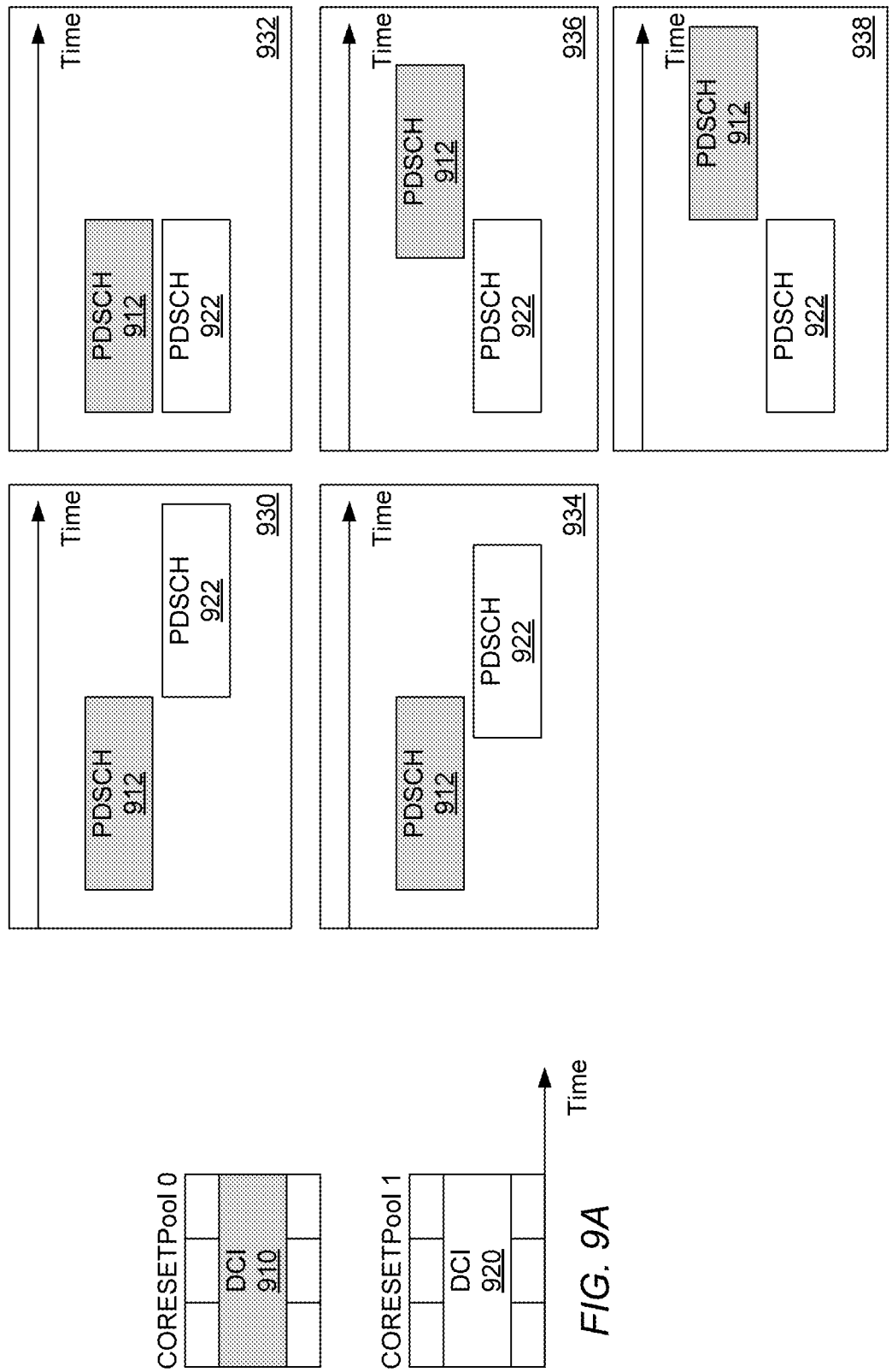
FIGS. 9A and 9B illustrate examples of scenarios when DCIs end at the same symbol, according to some embodiments.

Embodiments described herein provide mechanisms to allow a UE to decode multiple PDSCHs when multiple DCIs are configured. For example, FIG. 9A illustrates a scenario in which multiple DCIs end at the same symbol and FIG. 9B illustrates various example relationships of PDSCHs scheduled based on the DCIs of FIG. 9A. As illustrated by FIG. 9A, DCI 910 of CORESETPool 0 and DCI 920 of CORESETPool 1 may end at the same symbol. As illustrated by FIG. 9B, such a scenario may lead to various relative (in time) positions of PDSCHs associated with the DCIs (e.g. PDSCH 912 associated with DCI 910 and PDSCH 922 associated with DCI 920). For example, as illustrated by 930, PDSCH 922 may start at the end of PDSCH 912 and the PDSCHs may not overlap. Alternatively, as illustrated by 932, PDSCH 912 and PDSCH 922 may start and end at the same symbols and may fully overlap. Further, as illustrated by 934, PDSCH 912 may start prior to the start of PDSCH 922, but the PDSCHs may at least partially overlap. Similarly, as illustrated by 936, PDSCH 922 may start prior to the start of PDSCH 912, but the PDSCHs may at least partially overlap. Finally, as illustrated by 938, PDSCH 912 may start at the end of PDSCH 922 and the PDSCHs may not overlap.

In some embodiments, a UE may support multi-TRP operation, but may not support out of order PDSCH when 2 DCIs end at the same symbol, relying on a CORESETPool index to determine ordering of the PDSCHs. In some embodiments, for any two HARQ process IDs in a given scheduled cell, when the UE is scheduled to start receiving a first PDSCH starting in symbol j by a PDCCH from a CORESETPool with index 0 ending in symbol i, the UE may not be expected to be scheduled to receive a PDSCH starting earlier than the end of the first PDSCH with a PDCCH that ends also in symbol j from different CORESETPool, thus such embodiments may only support the example illustrated by 930 and may not support the examples illustrated by 932, 934, 936, and/or 938. In other words, such embodiments may only support in order delivery of the PDSCHs, where order may be determined by CORESETPool index. In some embodiments, for any two HARQ process IDs in a given scheduled cell, when the UE is scheduled to start receiving a first PDSCH starting in symbol j by a PDCCH from CORESETPool with index 0 ending in symbol i, the UE may not be expected to be scheduled to receive a PDSCH starting earlier than the first symbol of the first PDSCH with a PDCCH that ends also in symbol j from different CORESETPool, thus such embodiments may only support the examples illustrated by 930, 932, and 934 and may not support the examples illustrated by 936 and/or 938. In other words, such embodiments may only support delivery of the PDSCHs when a second PDSCH starts no earlier than a start of a first PDSCH, where order may be determined by CORESETPool index. In some embodiments, for any two HARQ process IDs in a given scheduled cell, when the UE is scheduled to start receiving a first PDSCH starting in symbol j by a PDCCH from CORESETPool with index 0 ending in symbol i, the UE may not be expected to be scheduled to receive a PDSCH ending earlier than the first symbol of the first PDSCH with a PDCCH that ends also in symbol j from different CORE-SETPools, thus such embodiments may only support the examples illustrated by 930, 932, 934 and 936 and may not support the example illustrated by 938. In other words, such embodiments may only support delivery of the PDSCHs when a second PDSCH does not end prior to a start of a first PDSCH, where order may be determined by CORESETPool index.

In some embodiments, a UE may support multi-TRP operation, but may not support out of order PDSCH when 2 DCI ends at the same symbol, but not relying on a CORE-SETPool index to determine ordering of the PDSCHs. In some embodiments, for any two HARQ process IDs in a given scheduled cell, when the UE is scheduled to start receiving a first PDSCH starting in symbol j by a PDCCH ending in symbol i, the UE may not be expected to be scheduled to receive a PDSCH with any time relation to the first PDSCH with a PDCCH that ends also in symbol j from different CORESETPools, thus such embodiments may support the examples illustrated by 930, 932, 934, 936 and 938. In other words, such embodiments may support any order of delivery of the PDSCHs. In some embodiments, for any two HARQ process IDs in a given scheduled cell, when the UE is scheduled to start receiving a first PDSCH starting in symbol j by a PDCCH ending in symbol i, the UE may not be expected to be scheduled to receive a PDSCH that overlaps with the first PDSCH with a PDCCH that ends also in symbol j from different CORESETPools, thus such embodiments may only support the examples illustrated by 930 and 938 and may not support the examples illustrated by 932, 934, and 936. In other words, such embodiments may only support delivery of the PDSCHs when delivery of the PDSCHs does not overlap. In some embodiments, for any two HARQ process IDs in a given scheduled cell, when the UE is scheduled to start receiving a first PDSCH starting in symbol j by a PDCCH ending in symbol i, the UE may not be expected to be scheduled to receive a PDSCH that does not overlap with the first PDSCH with a PDCCH that ends also in symbol j from different CORESETPools, thus such embodiments may only support the examples illustrated by 932, 934 and 936 and may not support the examples illustrated by 930 and 938. In other words, such embodiments may only support delivery of the PDSCHs when delivery of the PDSCHs at least partially overlap.

Figure 10:
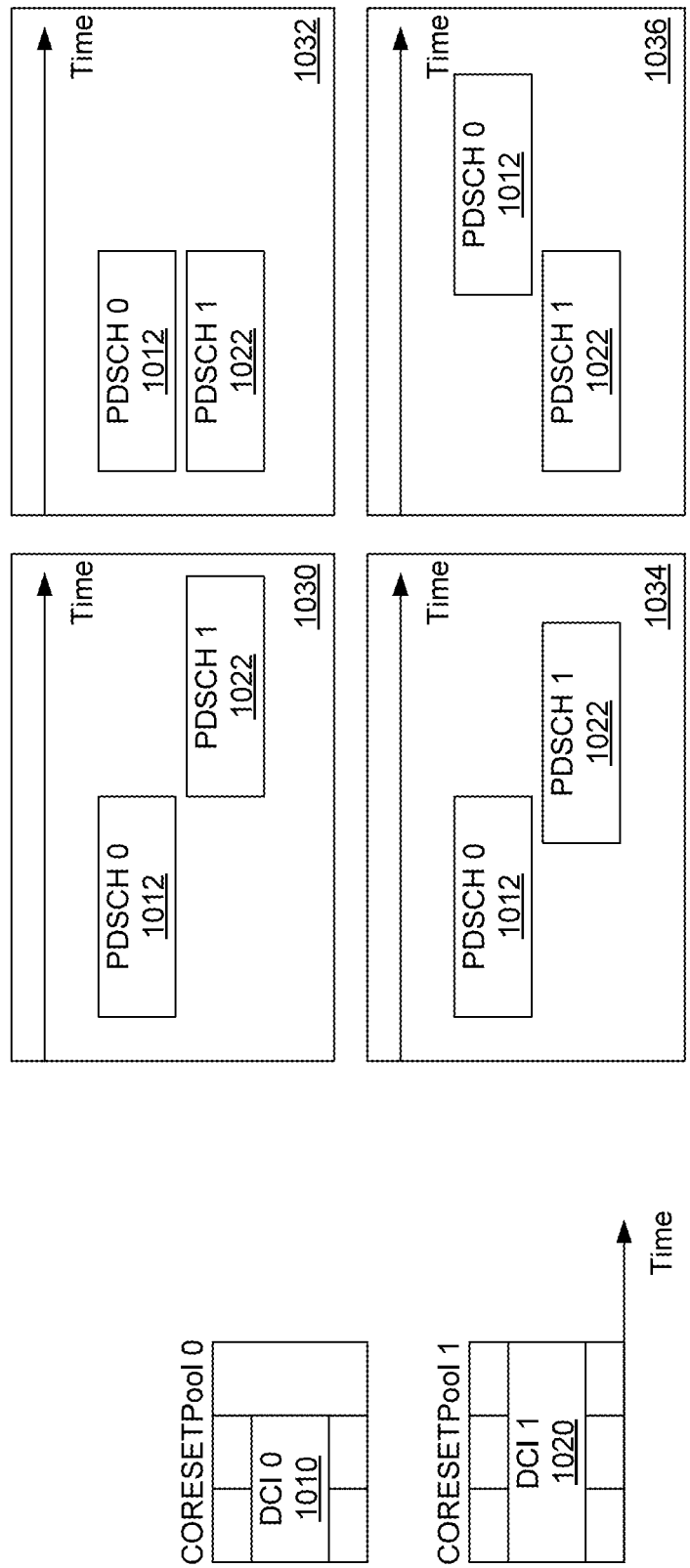
FIGS. 10A and 10B illustrate examples of scenarios when DCIs end at different symbols, according to some embodiments.

FIG. 10A illustrates a scenario in which multiple DCIs end at a different symbol and FIG. 10B illustrates various example relationships of PDSCHs scheduled based on the DCIs of FIG. 10A. As illustrated by FIG. 10A, DCI 1010 of CORESETPool 0 and DCI 1020 of CORESETPool 1 may end at different symbols. As illustrated by FIG. 10B, such a scenario may lead to various relative (in time) positions of PDSCHs associated with the DCIs (e.g. PDSCH 1012 associated with DCI 1010 and PDSCH 1022 associated with DCI 1020). For example, as illustrated by 1030, PDSCH 1022 may start at the end of PDSCH 1012 and the PDSCHs may not overlap. Alternatively, as illustrated by 1032, PDSCH 1012 and PDSCH 1022 may start and end at the same symbols and may fully overlap. Further, as illustrated by 1034, PDSCH 1012 may start prior to the start of PDSCH 1022, but the PDSCHs may at least partially overlap. Similarly, as illustrated by 1036, PDSCH 1022 may start prior to the start of PDSCH 1012, but the PDSCHs may at least partially overlap.

In some embodiments, a UE may support multi-TRP operation, but may not support out of order PDSCH when 2 DCI ends at different symbols. In some embodiments, for any two HARQ process IDs in a given scheduled cell, when the UE is scheduled to start receiving a first PDSCH starting in symbol j by a PDCCH ending in symbol i, the UE may not be expected to be scheduled to receive a PDSCH starting earlier than the end of the first PDSCH with a PDCCH that ends later than symbol i from different CORESETPool, thus such embodiments may only support the example illustrated by 1030 and may not support the examples illustrated by 1032, 1034, and/or 1036. In other words, such embodiments may only support in order delivery of the PDSCHs, where order may be determined by CORESETPool index. In some embodiments, for any two HARQ process IDs in a given scheduled cell, when the UE is scheduled to start receiving a first PDSCH starting in symbol j by a PDCCH ending in symbol i, the UE may not be expected to be scheduled to receive a PDSCH starting earlier than the first symbol of the first PDSCH with a PDCCH that ends later than symbol i from different CORESETPool, thus such embodiments may only support the examples illustrated by 1030, 1032, and 1034 and may not support the example illustrated 1036. In other words, such embodiments may only support delivery of the PDSCHs when a second PDSCH starts no earlier than a start of a first PDSCH.

In some embodiments, the principles described herein associated with the PDSCH may be used for PUSCH, except, overlapping PUSCH may be allowed, e.g., when a DCI ends at the same symbol utilizing CORESETPool, a starting symbol of PUSCH from CORESETPool 1 has to be later than the ending symbol of PUSCH from CORESETPool 0. Similarly, when a DCI ends at the same symbol and CORSETPool is not utilized, any timing relation except that 2 PUSCH cannot overlap may be used. In some embodiments, when DCIs end at different symbols, a starting symbol of a PUSCH scheduled by a later DCI has to be later than an ending symbol of PUSCH scheduled by an earlier DCI.

In some embodiments, the principles described herein associated with the PDSCH may be used for DL ACK/NACK. In some embodiments, in the same slot, for PDSCH scheduled by different CORESETPools, their ACK/NACK can have any time relationship. In some embodiments, a CORESETPool other than index 0 may not schedule an ACK/NACK earlier than a slot scheduled by CORESETPool 0 for ACK/NACK.

In some embodiments, for each monitoring occasion, up to 2 CORSETPools may be configured. Thus, a UE may double its downlink decoding subject to UE capability. For example, for feature group 3-1 (e.g., UE only supports single monitoring occasion for each slot):

for frequency division duplexing (FDD): one unicast DL and one unicast UL per slot per scheduled component carrier (CC) per CORESETPool;

for time division duplexing (TDD): one unicast DL and two unicast UL per slot per scheduled CC per CORESETPool.

Similarly, for feature group 3-5(b) (e.g., UE supports multiple monitoring occasion each slot):

for FDD: one unicast DL and one unicast UL per CC per set of monitoring occasions per CORESETPool;

for TDD: one unicast DL and two unicast UL per CC per set of monitoring occasions per CORESETPool;

for TDD: two unicast DL and one unicast UL per CC per set of monitoring occasions per CORESETPool.

In some embodiments, a UE may indicate when it supports single DCI multi-TRP operation mode 1, 2a, 2b, 3, 4 independently. In some embodiments, when the UE indicates it does not support a mode, but the network dynamically configures it, it may be considered an error case with unexpected UE behavior. In such embodiments, default behavior and/or fall back mode may be allowed, e.g.:

Mode 1: only one TCI state is used;

Mode 2a: only one TCI state is used, drop the PRB belongs to the second TRP;

Mode 2b: only one TCI state is used, drop the PRB belongs to the second TRP;

Mode 3: only one TCI state is used, drop all PDSCH except the first one; and/or

Mode 4: only one TCI state is used, drop all PDSCH except the first one.

In some embodiments, for a multi-TRP multi-DCI based ultra reliable low latency communication (URLLC) scheme, the UE may receive 2 PDSCHs with the same HARQ process ID overlapping in time. In some embodiments, for any HARQ process ID(s) in a given scheduled cell, the UE may be scheduled to receive 2 PDSCHs that overlap in time, e.g., when each PDSCH is scheduled by a DCI from different CORESETPool.

In some embodiments, for a multi-TRP multi-DCI based URLLC scheme, the UE may be scheduled to receive PDSCHs with the same HARQ process IDs before the ACK/NACK. In some embodiments, the UE may be scheduled to receive another PDSCH for a given HARQ process ID before the end of the expected transmission of HARQ-ACK for that HARQ process ID if (when) the PDSCH is scheduled by a DCI from another CORESETPool or cells in multi-TRP operation.

In some embodiments, a UE may indicate that it does not support R=2, for N3 less than or equal to 19, where N3 is a number of pre-coding matrix indicator (PMI) sub-bands and where R (either 1 or 2) is a number of PMI sub-bands per channel quality indicator (CQI) sub-band. In some embodiments, the UE may support R=2 for N3 less than or equal to 19 under the conditions of:

CSI reporting with R=2 and N3 less than or equal to 19 accounts for 2 CPU (channel state information (CSI) processing unit); and for aperiodic (AP) CSI reporting, Z and Z' timing requirements may be further relaxed.

FIGS. 11, 12, 13, and 14 illustrate block diagrams of examples of methods for multiple transmission and reception (multi-TRP) operation, according to some embodiments. The methods shown in FIGS. 11, 12, and 13 may be used in conjunction with any of the systems, methods, or devices shown in the Figures, among other devices. In various embodiments, some of the method elements shown may be performed concurrently, in a different order than shown, or may be omitted. Additional method elements may also be performed as desired.

Figure 11:
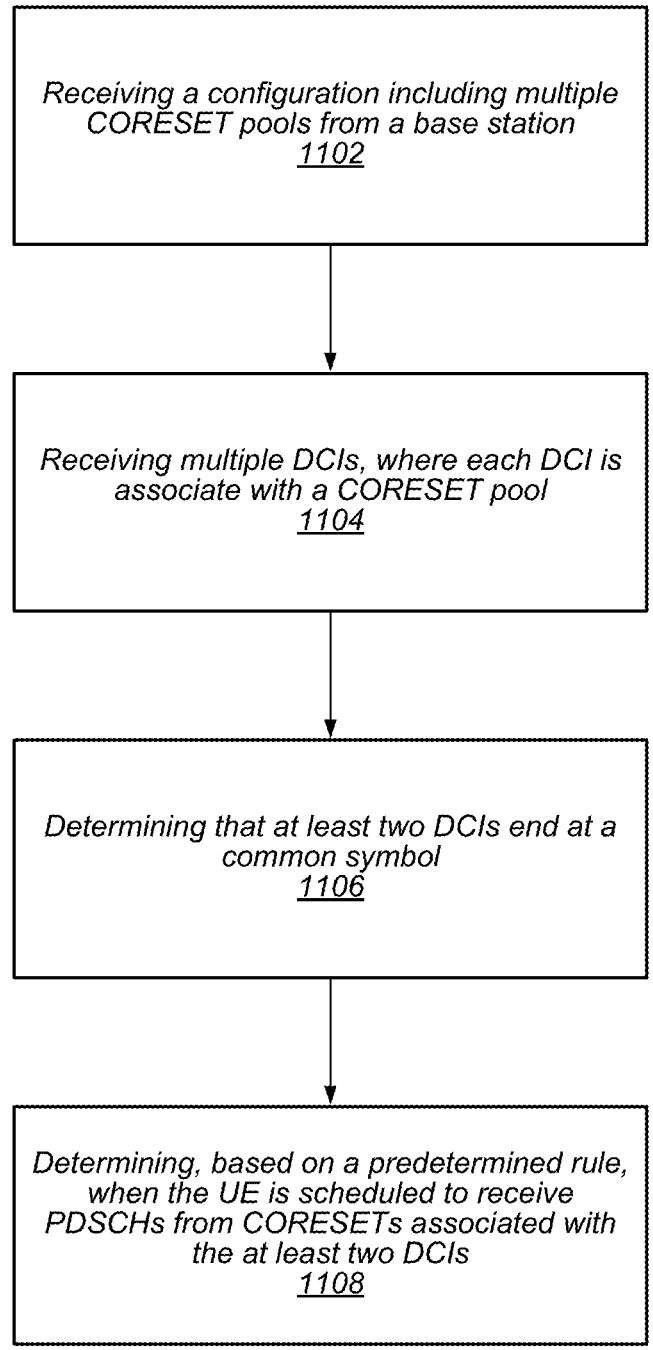
FIGS. 11, 12, 13, and 14 illustrates block diagrams of examples of methods for multiple transmission and reception (multi-TRP) operation, according to some embodiments.

Turning to FIG. 11, illustrated is a block diagram of an example of multi-TRP operation for reception, according to some embodiments. At 1102, a UE, such as UE 106 may receive, from a base station, such as base station 102, a configuration that may include multiple control resource set (CORESET) pools. In some embodiments, each CORESET pool may be associated with an index value, e.g., a CORE-SETPool index. In some embodiments, for each CORESET pool of the multiple CORESET pools, the UE may:

for frequency division duplexing, monitor one unicast downlink transmission and one unicast uplink transmission per slot per scheduled component carrier per CORESET pool; and/or for time division duplexing, monitor one unicast downlink transmission and two unicast uplink transmissions per slot per scheduled component carrier per CORESET pool.

In some embodiments, for each CORESET pool of the multiple CORESET pools, the UE may:

for frequency division duplexing, monitor one unicast downlink transmission and one unicast uplink transmission per component carrier set of monitoring occasions per CORESET pool;

for time division duplexing, monitor one unicast downlink transmission and two unicast uplink transmissions per component carrier set of monitoring occasions per CORESET pool; and/or for time division duplexing, monitor two unicast downlink transmissions and one unicast uplink transmission per component carrier set of monitoring occasions per CORESET pool.

At 1104, the UE may receive, from the base station, multiple downlink control indexes (DCIs). In some embodiments, each DCI may be associated with a CORESET pool, e.g., with a CORESET pool index value.

At 1106, the UE may determine that at least two DCIs of the multiple DCIs end at a common symbol. In other words, the UE may determine that more than one DCI ends at the same symbol.

At 1108, the UE may determine, based on a predetermined rule, when the UE may be scheduled to receive physical downlink control channels (PDSCHs) from CORE-SETs associated with the at least two DCIs. In other words, the UE may determine a possible relationship between the PDSCHs associated with the at least 2 DCIs based on the predetermined rule, e.g., an earliest possible starting/ending symbol of one PDSCH relative to another PDSCH. In some embodiments, the predetermined rule may include at least one of no overlap between PDSCHs (e.g., a starting symbol of one PDSCH does not occur until after an ending symbol of another PDSCH) or at least partial overlap between PDSCHs (e.g., a starting symbol of one PDSCH occurs prior to an ending symbol of another PDSCH).

In some embodiments, the predetermined rule may be based on the index value, e.g. the CORESETPool index. For example, when the predetermined rule is based on the index value, the predetermined rule may include at least one of:

when the UE is scheduled to start receiving a first PDSCH starting in symbol j by a physical downlink control channel (PDCCH) from a first CORESET pool with an index value of 0 and ending in symbol i, the UE may not be expected to be scheduled to receive a second PDSCH starting earlier than the end of the first PDSCH with a PDCCH that ends also in symbol j from a CORESET pool with non-zero index value;

when the UE is scheduled to start receiving a first PDSCH starting in symbol j by a PDCCH from a first CORE-SET pool with an index value of 0 and ending in symbol i, the UE may not be expected to be scheduled to receive a second PDSCH starting earlier than the first symbol of the first PDSCH with a PDCCH that ends also in symbol j from a CORESET pool with non-zero index value; and/or when the UE is scheduled to start receiving a first PDSCH starting in symbol j by a PDCCH from a first CORESET pool with an index value 0 ending in symbol i, the UE may not be expected to be scheduled to receive a second PDSCH ending earlier than the first symbol of the first PDSCH with a PDCCH that ends also in symbol j from a CORESET pool with non-zero index value.

In some embodiments, the predetermined rule may be based on a timing relationship between the PDSCHs. In such embodiments, the predetermined rule may include at least one of:

when the UE is scheduled to start receiving a first PDSCH starting in symbol j by a PDCCH ending in symbol i, the UE may not be expected to be scheduled to receive a second PDSCH with any time relation to the first PDSCH with a PDCCH that ends also in symbol j from a second CORESET pool;

when the UE is scheduled to start receiving a first PDSCH starting in symbol j by a second PDCCH ending in symbol i, the UE may not be expected to be scheduled to receive a PDSCH that overlaps with the first PDSCH with a PDCCH that ends also in symbol j from a second CORESET pool; and/or when the UE is scheduled to start receiving a first PDSCH starting in symbol j by a second PDCCH ending in symbol i, the UE may not be expected to be scheduled to receive a PDSCH that does not overlap with the first PDSCH with a PDCCH that ends also in symbol j from a second CORESET pool.

In some embodiments, the UE may determine that at least two DCIs of the multiple DCIs do not end at a common symbol. In such embodiments, the UE may determine, based on a second predetermined rule, when the UE may be scheduled to receive PDSCHs from CORESETs associated with the at least two DCIs. In some embodiments, the second predetermined rule may include at least one of:

when the UE is scheduled to start receiving a first PDSCH starting in symbol j by a PDCCH ending in symbol i, the UE may not be expected to be scheduled to receive a second PDSCH starting earlier than an end of the first PDSCH with a PDCCH that ends later than symbol i from a second CORESET pool; and/or when the UE is scheduled to start receiving a first PDSCH starting in symbol j by a PDCCH ending in symbol i, the UE may not be expected to be scheduled to receive a second PDSCH starting earlier than a first symbol of the first PDSCH with a PDCCH that ends later than symbol i from a second CORESET pool.

In some embodiments, the UE may indicate support of single DCI multi-TRP operation modes 1, 2a, 2b, 3, and 4 independently. In such embodiments, the UE may receive, from the base station, a configuration for a single DCI multi-TRP operation mode the UE has indicated it does not support and operate in a fall back mode.

In some embodiments, for multi-TRP multi-DCI based ultra reliable low latency communication (URLLC), the UE may receive multiple PDSCHs with a common HARQ process ID overlapping in time. In some embodiments, for multi-TRP multi-DCI based URLLC, the UE may be scheduled to receive a second PDSCH with a HARQ process ID common to a first PDSCH prior to transmission of an ACK/NACK associated with the first PDSCH.

In some embodiments, the UE may indicate that it does not support 2 pre-coding matrix indexes (PMIs) sub-bands per channel quality indicator (CQI) sub-band for less than 20 PMI sub-bands.

In some embodiments, the UE may determine, based on a second predetermined rule, when the UE may be scheduled to transmit PUSCHs from CORESETs associated with the at least two DCIs. In other words, the UE may determine a possible relationship between the PUSCHs associated with the at least 2 DCIs based on the second predetermined rule, e.g., an earliest possible starting/ending symbol of one PUSCH relative to another PUSCH. In some embodiments, the second predetermined rule may include at least one of no overlap between PUSCHs (e.g., a starting symbol of one PUSCH does not occur until after an ending symbol of another PUSCH) or at least partial overlap between PUSCHs (e.g., a starting symbol of one PUSCH occurs prior to an ending symbol of another PUSCH).

In some embodiments, the second predetermined rule may be based on the index value, e.g. the CORESETPool index. For example, when the second predetermined rule is based on the index value, the predetermined rule may include at least one of:

when the UE is scheduled to start transmitting a first PUSCH starting in symbol j by a PDCCH from a first CORESET pool with an index value of 0 and ending in symbol i, the UE may not be expected to be scheduled to transmit a second PUSCH starting earlier than the end of the first PUSCH with a PDCCH that ends also in symbol j from a CORESET pool with non-zero index value;

when the UE is scheduled to start transmitting a first PUSCH starting in symbol j by a PDCCH from a first CORESET pool with an index value of 0 and ending in symbol i, the UE may not be expected to be scheduled to transmit a second PUSCH starting earlier than the first symbol of the first PUSCH with a PDCCH that ends also in symbol j from a CORESET pool with non-zero index value; and/or when the UE is scheduled to start transmitting a first PUSCH starting in symbol j by a PDCCH from a first CORESET pool with an index value 0 ending in symbol i, the UE may not be expected to be scheduled to transmit a second PUSCH ending earlier than the first symbol of the first PUSCH with a PDCCH that ends also in symbol j from a CORESET pool with non-zero index value.

In some embodiments, the second predetermined rule may be based on a timing relationship between the PUSCHs. In such embodiments, the second predetermined rule may include at least one of:

when the UE is scheduled to start transmitting a first PUSCH starting in symbol j by a PDCCH ending in symbol i, the UE may not be expected to be scheduled to transmit a second PUSCH with any time relation to the first PUSCH with a PDCCH that ends also in symbol j from a second CORESET pool;

when the UE is scheduled to start transmitting a first PUSCH starting in symbol j by a second PDCCH ending in symbol i, the UE may not be expected to be scheduled to receive a PUSCH that overlaps with the first PUSCH with a PDCCH that ends also in symbol j from a second CORESET pool; and/or when the UE is scheduled to start transmitting a first PUSCH starting in symbol j by a second PDCCH ending in symbol i, the UE may not be expected to be scheduled to transmit a PUSCH that does not overlap with the first PUSCH with a PDCCH that ends also in symbol j from a second CORESET pool.

In some embodiments, the UE may determine that at least two DCIs of the multiple DCIs do not end at a common symbol. In such embodiments, the UE may determine, based on a second predetermined rule, when the UE may be scheduled to transmit PUSCHs from CORESETs associated with the at least two DCIs. In some embodiments, the second predetermined rule may include at least one of:
- when the UE is scheduled to start transmitting a first PUSCH starting in symbol j by a PDCCH ending in symbol i, the UE may not be expected to be scheduled to transmit a second PUSCH starting earlier than an end of the first PUSCH with a PDCCH that ends later than symbol i from a second CORESET pool; and/or
- when the UE is scheduled to start transmitting a first PUSCH starting in symbol j by a PDCCH ending in symbol i, the UE may not be expected to be scheduled to transmit a second PUSCH starting earlier than a first symbol of the first PUSCH with a PDCCH that ends later than symbol i from a second CORESET pool.

In some embodiments, the UE may determine, based on a third predetermined rule, when the UE may be scheduled to transmit acknowledgments/negative acknowledgments (ACK/NACKs) from CORESETs associated with the at least two DCIs. In other words, the UE may determine a possible relationship between ACK/NACKS for PDSCHs associated with the at least 2 DCIs based on the third predetermined rule. In some embodiments, the third predetermined rule may include at least one of:
- in a common slot, for a PDSCH scheduled by a second CORESET pool, ACK/NACKs may have any time relationship; and/or
- in a common slot, for a PDSCH scheduled by a second CORESET pool, a CORESET pool having a non-zero index value may not schedule an ACK/NACK earlier than a slot scheduled by a CORESET pool having an index value of 0 for ACK/NACK.

Figure 12:
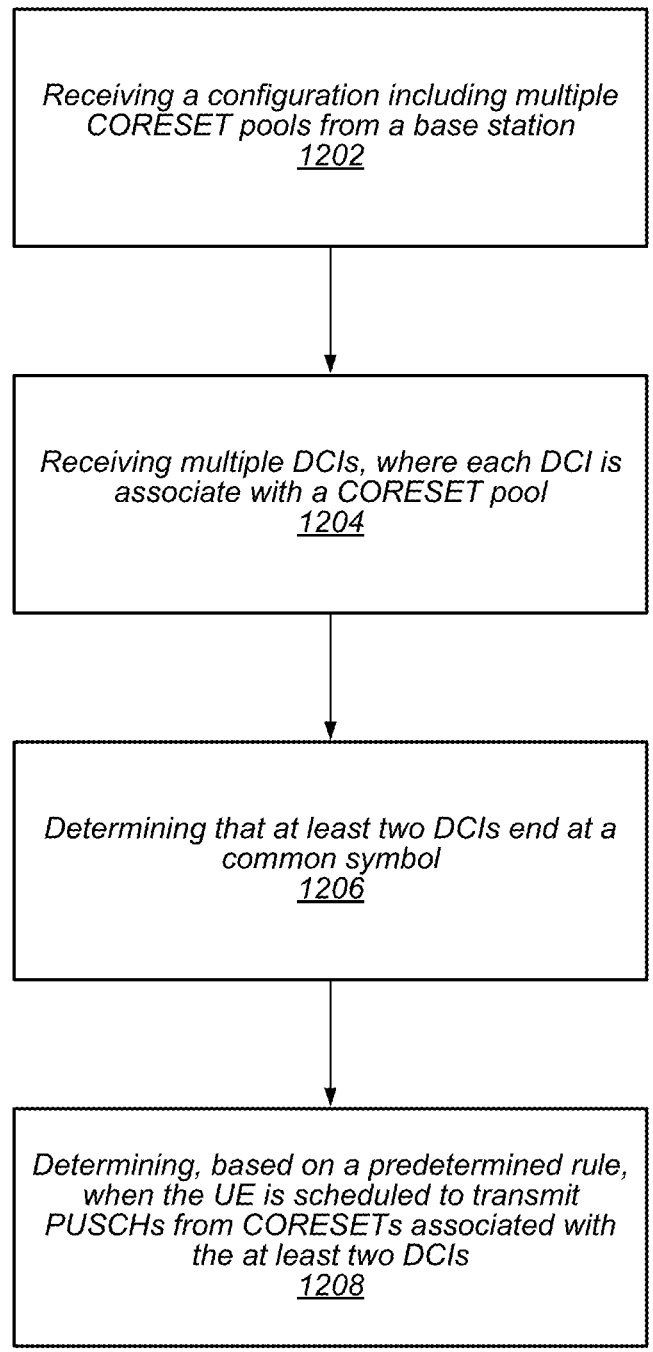

Turning to FIG. 12, illustrated is a block diagram of an example of multi-TRP operation for transmission, according to some embodiments. At 1202, a UE, such as UE 106 may receive, from a base station, such as base station 102, a configuration that may include multiple control resource set (CORESET) pools. In some embodiments, each CORESET pool may be associated with an index value, e.g., a CORESETPool index. In some embodiments, for each CORESET pool of the multiple CORESET pools, the UE may:
- for frequency division duplexing, monitor one unicast downlink transmission and one unicast uplink transmission per slot per scheduled component carrier per CORESET pool; and/or
- for time division duplexing, monitor one unicast downlink transmission and two unicast uplink transmissions per slot per scheduled component carrier per CORESET pool.

In some embodiments, for each CORESET pool of the multiple CORESET pools, the UE may:
- for frequency division duplexing, monitor one unicast downlink transmission and one unicast uplink transmission per component carrier set of monitoring occasions per CORESET pool;
- for time division duplexing, monitor one unicast downlink transmission and two unicast uplink transmissions per component carrier set of monitoring occasions per CORESET pool; and/or
- for time division duplexing, monitor two unicast downlink transmissions and one unicast uplink transmission per component carrier set of monitoring occasions per CORESET pool.

At 1204, the UE may receive, from the base station, multiple downlink control indexes (DCIs). In some embodiments, each DCI may be associated with a CORESET pool, e.g., with a CORESET pool index value.

At 1206, the UE may determine that at least two DCIs of the multiple DCIs end at a common symbol. In other words, the UE may determine that more than one DCI ends at the same symbol.

At 1208, the UE may determine, based on a predetermined rule, when the UE may be scheduled to transmit PUSCHs from CORESETs associated with the at least two DCIs. In other words, the UE may determine a possible relationship between the PUSCHs associated with the at least 2 DCIs based on the predetermined rule, e.g., an earliest possible starting/ending symbol of one PUSCH relative to another PUSCH. In some embodiments, the predetermined rule may include at least one of no overlap between PUSCHs (e.g., a starting symbol of one PUSCH does not occur until after an ending symbol of another PUSCH) or at least partial overlap between PUSCHs (e.g., a starting symbol of one PUSCH occurs prior to an ending symbol of another PUSCH).

In some embodiments, the predetermined rule may be based on the index value, e.g. the CORESETPool index. For example, when the predetermined rule is based on the index value, the predetermined rule may include at least one of:
- when the UE is scheduled to start transmitting a first PUSCH starting in symbol j by a PDCCH from a first CORESET pool with an index value of 0 and ending in symbol i, the UE may not be expected to be scheduled to transmit a second PUSCH starting earlier than the end of the first PUSCH with a PDCCH that ends also in symbol j from a CORESET pool with non-zero index value;
- when the UE is scheduled to start transmitting a first PUSCH starting in symbol j by a PDCCH from a first CORESET pool with an index value of 0 and ending in symbol i, the UE may not be expected to be scheduled to transmit a second PUSCH starting earlier than the first symbol of the first PUSCH with a PDCCH that ends also in symbol j from a CORESET pool with non-zero index value; and/or
- when the UE is scheduled to start transmitting a first PUSCH starting in symbol j by a PDCCH from a first CORESET pool with an index value 0 ending in symbol i, the UE may not be expected to be scheduled to transmit a second PUSCH ending earlier than the first symbol of the first PUSCH with a PDCCH that ends also in symbol j from a CORESET pool with non-zero index value.

In some embodiments, the predetermined rule may be based on a timing relationship between the PUSCHs. In such embodiments, the predetermined rule may include at least one of:
- when the UE is scheduled to start transmitting a first PUSCH starting in symbol j by a PDCCH ending in symbol i, the UE may not be expected to be scheduled to transmit a second PUSCH with any time relation to the first PUSCH with a PDCCH that ends also in symbol j from a second CORESET pool;
- when the UE is scheduled to start transmitting a first PUSCH starting in symbol j by a second PDCCH ending in symbol i, the UE may not be expected to be scheduled to receive a PUSCH that overlaps with the first PUSCH with a PDCCH that ends also in symbol j from a second CORESET pool; and/or
- when the UE is scheduled to start transmitting a first PUSCH starting in symbol j by a second PDCCH ending in symbol i, the UE may not be expected to be scheduled to transmit a PUSCH that does not overlap with the first PUSCH with a PDCCH that ends also in symbol j from a second CORESET pool.

In some embodiments, the UE may determine that at least two DCIs of the multiple DCIs do not end at a common symbol. In such embodiments, the UE may determine, based on a predetermined rule, when the UE may be scheduled to transmit PUSCHs from CORESETs associated with the at least two DCIs. In some embodiments, the predetermined rule may include at least one of:

- when the UE is scheduled to start transmitting a first PUSCH starting in symbol j by a PDCCH ending in symbol i, the UE may not be expected to be scheduled to transmit a second PUSCH starting earlier than an end of the first PUSCH with a PDCCH that ends later than symbol i from a second CORESET pool; and/or
- when the UE is scheduled to start transmitting a first PUSCH starting in symbol j by a PDCCH ending in symbol i, the UE may not be expected to be scheduled to transmit a second PUSCH starting earlier than a first symbol of the first PUSCH with a PDCCH that ends later than symbol i from a second CORESET pool.

In some embodiments, the UE may indicate support of single DCI multi-TRP operation modes 1, 2a, 2b, 3, and 4 independently. In such embodiments, the UE may receive, from the base station, a configuration for a single DCI multi-TRP operation mode the UE has indicated it does not support and operate in a fall back mode.

In some embodiments, for multi-TRP multi-DCI based ultra reliable low latency communication (URLLC), the UE may receive multiple PDSCHs with a common HARQ process ID overlapping in time. In some embodiments, for multi-TRP multi-DCI based URLLC, the UE may be scheduled to receive a second PDSCH with a HARQ process ID common to a first PDSCH prior to transmission of an ACK/NACK associated with the first PDSCH.

In some embodiments, the UE may indicate that it does not support 2 pre-coding matrix indexes (PMIs) sub-bands per channel quality indicator (CQI) sub-band for less than 20 PMI sub-bands.

In some embodiments, the UE may determine, based on a second predetermined rule when the UE is scheduled to receive physical downlink control channels (PDSCHs) from CORESETs associated with the at least two DCIs. In other words, the UE may determine a possible relationship between the PDSCHs associated with the at least 2 DCIs based on the second predetermined rule, e.g., an earliest possible starting/ending symbol of one PDSCH relative to another PDSCH. In some embodiments, the second predetermined rule may include at least one of no overlap between PDSCHs (e.g., a starting symbol of one PDSCH does not occur until after an ending symbol of another PDSCH) or at least partial overlap between PDSCHs (e.g., a starting symbol of one PDSCH occurs prior to an ending symbol of another PDSCH).

In some embodiments, the second predetermined rule may be based on the index value, e.g. the CORESETPool index. For example, when the second predetermined rule is based on the index value, the second predetermined rule may include at least one of:

- when the UE is scheduled to start receiving a first PDSCH starting in symbol j by a physical downlink control channel (PDCCH) from a first CORESET pool with an index value of 0 and ending in symbol i, the UE may not be expected to be scheduled to receive a second PDSCH starting earlier than the end of the first PDSCH with a PDCCH that ends also in symbol j from a CORESET pool with non-zero index value;
- when the UE is scheduled to start receiving a first PDSCH starting in symbol j by a PDCCH from a first CORESET pool with an index value of 0 and ending in symbol i, the UE may not be expected to be scheduled to receive a second PDSCH starting earlier than the first symbol of the first PDSCH with a PDCCH that ends also in symbol j from a CORESET pool with non-zero index value; and/or
- when the UE is scheduled to start receiving a first PDSCH starting in symbol j by a PDCCH from a first CORESET pool with an index value 0 ending in symbol i, the UE may not be expected to be scheduled to receive a second PDSCH ending earlier than the first symbol of the first PDSCH with a PDCCH that ends also in symbol j from a CORESET pool with non-zero index value.

In some embodiments, the second predetermined rule may be based on a timing relationship between the PDSCHs. In such embodiments, the second predetermined rule may include at least one of:

- when the UE is scheduled to start receiving a first PDSCH starting in symbol j by a PDCCH ending in symbol i, the UE may not be expected to be scheduled to receive a second PDSCH with any time relation to the first PDSCH with a PDCCH that ends also in symbol j from a second CORESET pool;
- when the UE is scheduled to start receiving a first PDSCH starting in symbol j by a second PDCCH ending in symbol i, the UE may not be expected to be scheduled to receive a PDSCH that overlaps with the first PDSCH with a PDCCH that ends also in symbol j from a second CORESET pool; and/or
- when the UE is scheduled to start receiving a first PDSCH starting in symbol j by a second PDCCH ending in symbol i, the UE may not be expected to be scheduled to receive a PDSCH that does not overlap with the first PDSCH with a PDCCH that ends also in symbol j from a second CORESET pool.

In some embodiments, the UE may determine that at least two DCIs of the multiple DCIs do not end at a common symbol. In such embodiments, the UE may determine, based on a second predetermined rule, when the UE may be scheduled to receive PDSCHs from CORESETs associated with the at least two DCIs. In some embodiments, the second predetermined rule may include at least one of:

- when the UE is scheduled to start receiving a first PDSCH starting in symbol j by a PDCCH ending in symbol i, the UE may not be expected to be scheduled to receive a second PDSCH starting earlier than an end of the first PDSCH with a PDCCH that ends later than symbol i from a second CORESET pool; and/or
- when the UE is scheduled to start receiving a first PDSCH starting in symbol j by a PDCCH ending in symbol i, the UE may not be expected to be scheduled to receive a second PDSCH starting earlier than a first symbol of the first PDSCH with a PDCCH that ends later than symbol i from a second CORESET pool.

In some embodiments, the UE may determine, based on a third predetermined rule, when the UE may be scheduled to transmit acknowledgments/negative acknowledgments (ACK/NACKs) from CORESETs associated with the at least two DCIs. In other words, the UE may determine a possible relationship between ACK/NACKS for PDSCHs associated with the at least 2 DCIs based on the third predetermined rule. In some embodiments, the third predetermined rule may include at least one of:
- in a common slot, for a PDSCH scheduled by a second CORESET pool, ACK/NACKs may have any time relationship; and/or
- in a common slot, for a PDSCH scheduled by a second CORESET pool, a CORESET pool having a non-zero index value may not schedule an ACK/NACK earlier than a slot scheduled by a CORESET pool having an index value of 0 for ACK/NACK.

Figure 13:
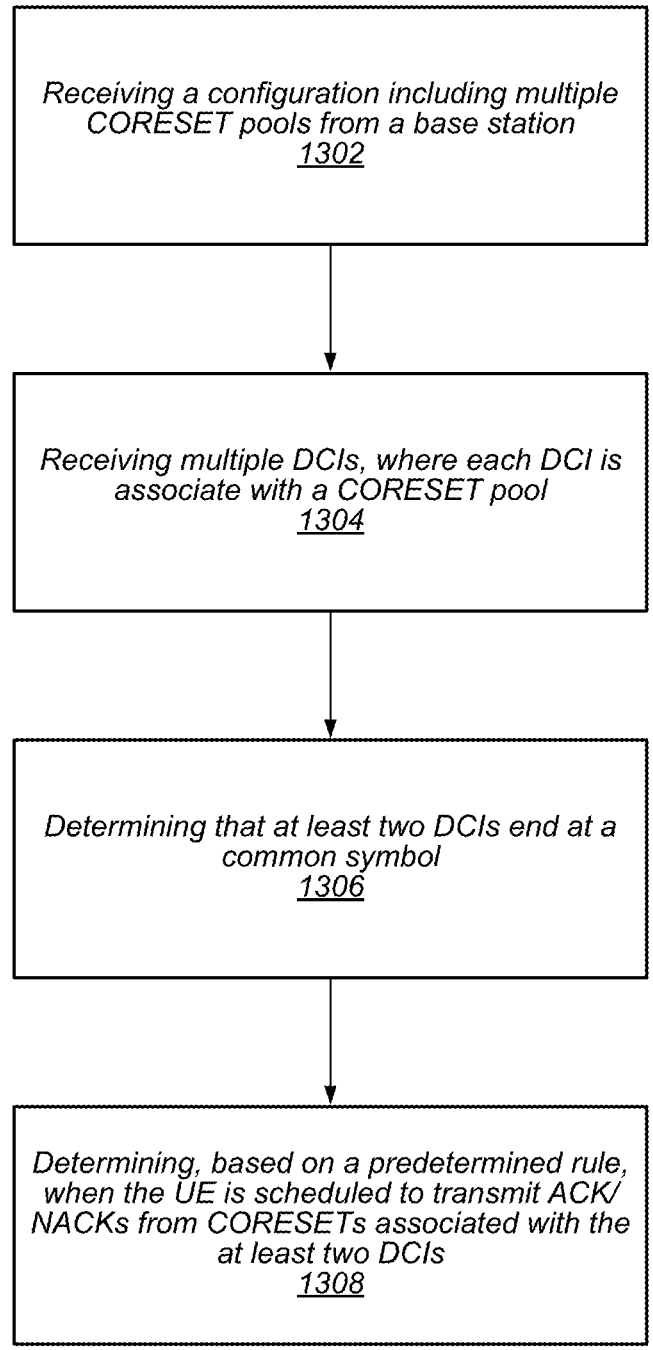

Turning to FIG. 13, illustrated is a block diagram of an example of multi-TRP operation for ACK/NACK, according to some embodiments. At 1302, a UE, such as UE 106 may receive, from a base station, such as base station 102, a configuration that may include multiple control resource set (CORESET) pools. In some embodiments, each CORESET pool may be associated with an index value, e.g., a CORESETPool index. In some embodiments, for each CORESET pool of the multiple CORESET pools, the UE may:
- for frequency division duplexing, monitor one unicast downlink transmission and one unicast uplink transmission per slot per scheduled component carrier per CORESET pool; and/or
- for time division duplexing, monitor one unicast downlink transmission and two unicast uplink transmissions per slot per scheduled component carrier per CORESET pool.

In some embodiments, for each CORESET pool of the multiple CORESET pools, the UE may:
- for frequency division duplexing, monitor one unicast downlink transmission and one unicast uplink transmission per component carrier set of monitoring occasions per CORESET pool;
- for time division duplexing, monitor one unicast downlink transmission and two unicast uplink transmissions per component carrier set of monitoring occasions per CORESET pool; and/or
- for time division duplexing, monitor two unicast downlink transmissions and one unicast uplink transmission per component carrier set of monitoring occasions per CORESET pool.

At 1304, the UE may receive, from the base station, multiple downlink control indexes (DCIs). In some embodiments, each DCI may be associated with a CORESET pool, e.g., with a CORESET pool index value.

At 1306, the UE may determine that at least two DCIs of the multiple DCIs end at a common symbol. In other words, the UE may determine that more than one DCI ends at the same symbol.

At 1308, the UE may determine, based on a predetermined rule, when the UE may be scheduled to transmit acknowledgments/negative acknowledgments (ACK/NACKs) from CORESETs associated with the at least two DCIs. In other words, the UE may determine a possible relationship between ACK/NACKS for PDSCHs associated with the at least 2 DCIs based on the predetermined rule. In some embodiments, the predetermined rule may include at least one of:
- in a common slot, for a PDSCH scheduled by a second CORESET pool, ACK/NACKs may have any time relationship; and/or
- in a common slot, for a PDSCH scheduled by a second CORESET pool, a CORESET pool having a non-zero index value may not schedule an ACK/NACK earlier than a slot scheduled by a CORESET pool having an index value of 0 for ACK/NACK.

In some embodiments, the UE may indicate support of single DCI multi-TRP operation modes 1, 2a, 2b, 3, and 4 independently. In such embodiments, the UE may receive, from the base station, a configuration for a single DCI multi-TRP operation mode the UE has indicated it does not support and operate in a fall back mode.

In some embodiments, for multi-TRP multi-DCI based ultra reliable low latency communication (URLLC), the UE may receive multiple PDSCHs with a common HARQ process ID overlapping in time. In some embodiments, for multi-TRP multi-DCI based URLLC, the UE may be scheduled to receive a second PDSCH with a HARQ process ID common to a first PDSCH prior to transmission of an ACK/NACK associated with the first PDSCH.

In some embodiments, the UE may indicate that it does not support 2 pre-coding matrix indexes (PMIs) sub-bands per channel quality indicator (CQI) sub-band for less than 20 PMI sub-bands.

In some embodiments, the UE may determine, based on a second predetermined rule when the UE is scheduled to receive physical downlink control channels (PDSCHs) from CORESETs associated with the at least two DCIs. In other words, the UE may determine a possible relationship between the PDSCHs associated with the at least 2 DCIs based on the second predetermined rule, e.g., an earliest possible starting/ending symbol of one PDSCH relative to another PDSCH. In some embodiments, the second predetermined rule may include at least one of no overlap between PDSCHs (e.g., a starting symbol of one PDSCH does not occur until after an ending symbol of another PDSCH) or at least partial overlap between PDSCHs (e.g., a starting symbol of one PDSCH occurs prior to an ending symbol of another PDSCH).

In some embodiments, the second predetermined rule may be based on the index value, e.g. the CORESETPool index. For example, when the second predetermined rule is based on the index value, the second predetermined rule may include at least one of:
- when the UE is scheduled to start receiving a first PDSCH starting in symbol j by a physical downlink control channel (PDCCH) from a first CORESET pool with an index value of 0 and ending in symbol i, the UE may not be expected to be scheduled to receive a second PDSCH starting earlier than the end of the first PDSCH with a PDCCH that ends also in symbol j from a CORESET pool with non-zero index value;
- when the UE is scheduled to start receiving a first PDSCH starting in symbol j by a PDCCH from a first CORESET pool with an index value of 0 and ending in symbol i, the UE may not be expected to be scheduled to receive a second PDSCH starting earlier than the first symbol of the first PDSCH with a PDCCH that ends also in symbol j from a CORESET pool with non-zero index value; and/or
- when the UE is scheduled to start receiving a first PDSCH starting in symbol j by a PDCCH from a first CORESET pool with an index value 0 ending in symbol i, the UE may not be expected to be scheduled to receive a second PDSCH ending earlier than the first symbol of the first PDSCH with a PDCCH that ends also in symbol j from a CORESET pool with non-zero index value.

In some embodiments, the second predetermined rule may be based on a timing relationship between the PDSCHs. In such embodiments, the second predetermined rule may include at least one of:

when the UE is scheduled to start receiving a first PDSCH starting in symbol j by a PDCCH ending in symbol i, the UE may not be expected to be scheduled to receive a second PDSCH with any time relation to the first PDSCH with a PDCCH that ends also in symbol j from a second CORESET pool;

when the UE is scheduled to start receiving a first PDSCH starting in symbol j by a second PDCCH ending in symbol i, the UE may not be expected to be scheduled to receive a PDSCH that overlaps with the first PDSCH with a PDCCH that ends also in symbol j from a second CORESET pool; and/or when the UE is scheduled to start receiving a first PDSCH starting in symbol j by a second PDCCH ending in symbol i, the UE may not be expected to be scheduled to receive a PDSCH that does not overlap with the first PDSCH with a PDCCH that ends also in symbol j from a second CORESET pool.

In some embodiments, the UE may determine that at least two DCIs of the multiple DCIs do not end at a common symbol. In such embodiments, the UE may determine, based on a second predetermined rule, when the UE may be scheduled to receive PDSCHs from CORESETs associated with the at least two DCIs. In some embodiments, the second predetermined rule may include at least one of:

when the UE is scheduled to start receiving a first PDSCH starting in symbol j by a PDCCH ending in symbol i, the UE may not be expected to be scheduled to receive a second PDSCH starting earlier than an end of the first PDSCH with a PDCCH that ends later than symbol i from a second CORESET pool; and/or when the UE is scheduled to start receiving a first PDSCH starting in symbol j by a PDCCH ending in symbol i, the UE may not be expected to be scheduled to receive a second PDSCH starting earlier than a first symbol of the first PDSCH with a PDCCH that ends later than symbol i from a second CORESET pool.

In some embodiments, the UE may determine, based on a third predetermined rule, when the UE may be scheduled to transmit PUSCHs from CORESETs associated with the at least two DCIs. In other words, the UE may determine a possible relationship between the PUSCHs associated with the at least 2 DCIs based on the third predetermined rule, e.g., an earliest possible starting/ending symbol of one PUSCH relative to another PUSCH. In some embodiments, the third predetermined rule may include at least one of no overlap between PUSCHs (e.g., a starting symbol of one PUSCH does not occur until after an ending symbol of another PUSCH) or at least partial overlap between PUSCHs (e.g., a starting symbol of one PUSCH occurs prior to an ending symbol of another PUSCH).

In some embodiments, the third predetermined rule may be based on the index value, e.g. the CORESETPool index. For example, when the third predetermined rule is based on the index value, the predetermined rule may include at least one of:

when the UE is scheduled to start transmitting a first PUSCH starting in symbol j by a PDCCH from a first CORESET pool with an index value of 0 and ending in symbol i, the UE may not be expected to be scheduled to transmit a second PUSCH starting earlier than the end of the first PUSCH with a PDCCH that ends also in symbol j from a CORESET pool with non-zero index value;

when the UE is scheduled to start transmitting a first PUSCH starting in symbol j by a PDCCH from a first CORESET pool with an index value of 0 and ending in symbol i, the UE may not be expected to be scheduled to transmit a second PUSCH starting earlier than the first symbol of the first PUSCH with a PDCCH that ends also in symbol j from a CORESET pool with non-zero index value; and/or when the UE is scheduled to start transmitting a first PUSCH starting in symbol j by a PDCCH from a first CORESET pool with an index value 0 ending in symbol i, the UE may not be expected to be scheduled to transmit a second PUSCH ending earlier than the first symbol of the first PUSCH with a PDCCH that ends also in symbol j from a CORESET pool with non-zero index value.

In some embodiments, the third predetermined rule may be based on a timing relationship between the PUSCHs. In such embodiments, the third predetermined rule may include at least one of:

when the UE is scheduled to start transmitting a first PUSCH starting in symbol j by a PDCCH ending in symbol i, the UE may not be expected to be scheduled to transmit a second PUSCH with any time relation to the first PUSCH with a PDCCH that ends also in symbol j from a second CORESET pool;

when the UE is scheduled to start transmitting a first PUSCH starting in symbol j by a second PDCCH ending in symbol i, the UE may not be expected to be scheduled to receive a PUSCH that overlaps with the first PUSCH with a PDCCH that ends also in symbol j from a second CORESET pool; and/or when the UE is scheduled to start transmitting a first PUSCH starting in symbol j by a second PDCCH ending in symbol i, the UE may not be expected to be scheduled to transmit a PUSCH that does not overlap with the first PUSCH with a PDCCH that ends also in symbol j from a second CORESET pool.

In some embodiments, the UE may determine that at least two DCIs of the multiple DCIs do not end at a common symbol. In such embodiments, the UE may determine, based on a third predetermined rule, when the UE may be scheduled to transmit PUSCHs from CORESETs associated with the at least two DCIs. In some embodiments, the third predetermined rule may include at least one of:

when the UE is scheduled to start transmitting a first PUSCH starting in symbol j by a PDCCH ending in symbol i, the UE may not be expected to be scheduled to transmit a second PUSCH starting earlier than an end of the first PUSCH with a PDCCH that ends later than symbol i from a second CORESET pool; and/or when the UE is scheduled to start transmitting a first PUSCH starting in symbol j by a PDCCH ending in symbol i, the UE may not be expected to be scheduled to transmit a second PUSCH starting earlier than a first symbol of the first PUSCH with a PDCCH that ends later than symbol i from a second CORESET pool.

Figure 14:
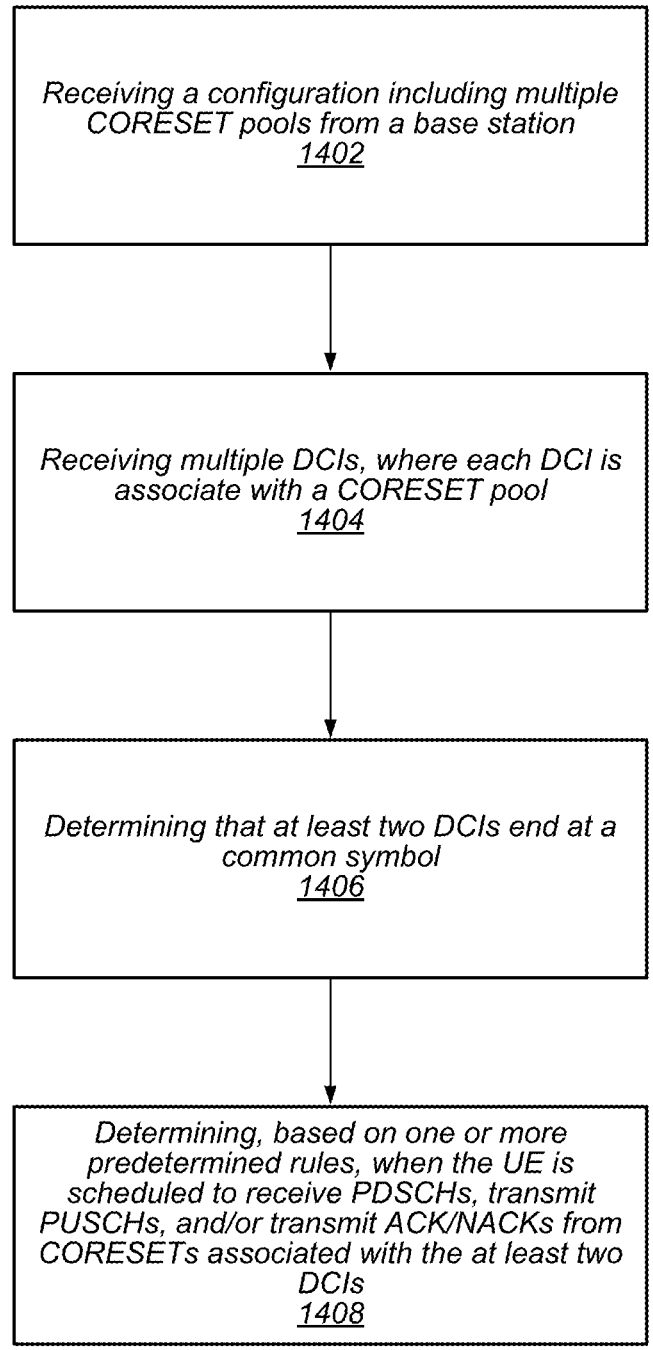

Turning to FIG. 14, illustrated is a block diagram of an example of multi-TRP operation for reception, according to some embodiments. At 1402, a UE, such as UE 106 may receive, from a base station, such as base station 102, a configuration that may include multiple control resource set (CORESET) pools. In some embodiments, each CORESET pool may be associated with an index value, e.g., a CORESETPool index. In some embodiments, for each CORESET pool of the multiple CORESET pools, the UE may:

for frequency division duplexing, monitor one unicast downlink transmission and one unicast uplink transmission per slot per scheduled component carrier per CORESET pool; and/or for time division duplexing, monitor one unicast downlink transmission and two unicast uplink transmissions per slot per scheduled component carrier per CORESET pool.

In some embodiments, for each CORESET pool of the multiple CORESET pools, the UE may:

for frequency division duplexing, monitor one unicast downlink transmission and one unicast uplink transmission per component carrier set of monitoring occasions per CORESET pool;

for time division duplexing, monitor one unicast downlink transmission and two unicast uplink transmissions per component carrier set of monitoring occasions per CORESET pool; and/or for time division duplexing, monitor two unicast downlink transmissions and one unicast uplink transmission per component carrier set of monitoring occasions per CORESET pool.

At 1404, the UE may receive, from the base station, multiple downlink control indexes (DCIs). In some embodiments, each DCI may be associated with a CORESET pool, e.g., with a CORESET pool index value.

At 1406, the UE may determine that at least two DCIs of the multiple DCIs end at a common symbol. In other words, the UE may determine that more than one DCI ends at the same symbol.

At 1408, the UE may determine, based on one or more predetermined rules, when the UE may be scheduled to receive PDSCHs, transmit PUSCHs, and/or transmit ACK/NACKs from CORESETs associated with the at least two DCIs. For example, the UE may determine a possible relationship between the PDSCHs associated with the at least 2 DCIs based on a first predetermined rule of the one or more predetermined rules, e.g., an earliest possible starting/ending symbol of one PDSCH relative to another PDSCH. In some embodiments, the first predetermined rule may include at least one of no overlap between PDSCHs (e.g., a starting symbol of one PDSCH does not occur until after an ending symbol of another PDSCH) or at least partial overlap between PDSCHs (e.g., a starting symbol of one PDSCH occurs prior to an ending symbol of another PDSCH). As another example, the UE may determine a possible relationship between the PUSCHs associated with the at least 2 DCIs based on a second predetermined rule of the one or more predetermined rules, e.g., an earliest possible starting/ending symbol of one PUSCH relative to another PUSCH. In some embodiments, the second predetermined rule may include at least one of no overlap between PUSCHs (e.g., a starting symbol of one PUSCH does not occur until after an ending symbol of another PUSCH) or at least partial overlap between PUSCHs (e.g., a starting symbol of one PUSCH occurs prior to an ending symbol of another PUSCH). As a further example, the UE may determine a possible relationship between ACK/NACKS for PDSCHs from CORESETs associated with the at least two DCIs based on a third predetermined rule of the one or more predetermined rules.

In some embodiments, the first predetermined rule may be based on the index value, e.g. the CORESETPool index. For example, when the first predetermined rule is based on the index value, the first predetermined rule may include at least one of:

when the UE is scheduled to start receiving a first PDSCH starting in symbol j by a physical downlink control channel (PDCCH) from a first CORESET pool with an index value of 0 and ending in symbol i, the UE may not be expected to be scheduled to receive a second PDSCH starting earlier than the end of the first PDSCH with a PDCCH that ends also in symbol j from a CORESET pool with non-zero index value;

when the UE is scheduled to start receiving a first PDSCH starting in symbol j by a PDCCH from a first CORESET pool with an index value of 0 and ending in symbol i, the UE may not be expected to be scheduled to receive a second PDSCH starting earlier than the first symbol of the first PDSCH with a PDCCH that ends also in symbol j from a CORESET pool with non-zero index value; and/or when the UE is scheduled to start receiving a first PDSCH starting in symbol j by a PDCCH from a first CORESET pool with an index value 0 ending in symbol i, the UE may not be expected to be scheduled to receive a second PDSCH ending earlier than the first symbol of the first PDSCH with a PDCCH that ends also in symbol j from a CORESET pool with non-zero index value.

In some embodiments, the first predetermined rule may be based on a timing relationship between the PDSCHs. In such embodiments, the first predetermined rule may include at least one of:

when the UE is scheduled to start receiving a first PDSCH starting in symbol j by a PDCCH ending in symbol i, the UE may not be expected to be scheduled to receive a second PDSCH with any time relation to the first PDSCH with a PDCCH that ends also in symbol j from a second CORESET pool;

when the UE is scheduled to start receiving a first PDSCH starting in symbol j by a second PDCCH ending in symbol i, the UE may not be expected to be scheduled to receive a PDSCH that overlaps with the first PDSCH with a PDCCH that ends also in symbol j from a second CORESET pool; and/or when the UE is scheduled to start receiving a first PDSCH starting in symbol j by a second PDCCH ending in symbol i, the UE may not be expected to be scheduled to receive a PDSCH that does not overlap with the first PDSCH with a PDCCH that ends also in symbol j from a second CORESET pool.

In some embodiments, the second predetermined rule may be based on the index value, e.g. the CORESETPool index. For example, when the second predetermined rule is based on the index value, the predetermined rule may include at least one of:

when the UE is scheduled to start transmitting a first PUSCH starting in symbol j by a PDCCH from a first CORESET pool with an index value of 0 and ending in symbol i, the UE may not be expected to be scheduled to transmit a second PUSCH starting earlier than the end of the first PUSCH with a PDCCH that ends also in symbol j from a CORESET pool with non-zero index value;

when the UE is scheduled to start transmitting a first PUSCH starting in symbol j by a PDCCH from a first CORESET pool with an index value of 0 and ending in symbol i, the UE may not be expected to be scheduled to transmit a second PUSCH starting earlier than the first symbol of the first PUSCH with a PDCCH that ends also in symbol j from a CORESET pool with non-zero index value; and/or when the UE is scheduled to start transmitting a first PUSCH starting in symbol j by a PDCCH from a first CORESET pool with an index value 0 ending in symbol i, the UE may not be expected to be scheduled to transmit a second PUSCH ending earlier than the first symbol of the first PUSCH with a PDCCH that ends also in symbol j from a CORESET pool with non-zero index value.

In some embodiments, the second predetermined rule may be based on a timing relationship between the PUSCHs. In such embodiments, the second predetermined rule may include at least one of:

when the UE is scheduled to start transmitting a first PUSCH starting in symbol j by a PDCCH ending in symbol i, the UE may not be expected to be scheduled to transmit a second PUSCH with any time relation to the first PUSCH with a PDCCH that ends also in symbol j from a second CORESET pool;

when the UE is scheduled to start transmitting a first PUSCH starting in symbol j by a second PDCCH ending in symbol i, the UE may not be expected to be scheduled to receive a PUSCH that overlaps with the first PUSCH with a PDCCH that ends also in symbol j from a second CORESET pool; and/or when the UE is scheduled to start transmitting a first PUSCH starting in symbol j by a second PDCCH ending in symbol i, the UE may not be expected to be scheduled to transmit a PUSCH that does not overlap with the first PUSCH with a PDCCH that ends also in symbol j from a second CORESET pool.

In some embodiments, the third predetermined rule may include at least one of:

in a common slot, for a PDSCH scheduled by a second CORESET pool, ACK/NACKs may have any time relationship; and/or in a common slot, for a PDSCH scheduled by a second CORESET pool, a CORESET pool having a non-zero index value may not schedule an ACK/NACK earlier than a slot scheduled by a CORESET pool having an index value of 0 for ACK/NACK.

In some embodiments, the UE may determine that at least two DCIs of the multiple DCIs do not end at a common symbol. In such embodiments, the UE may determine, based on a fourth predetermined rule of the one or more predetermined rules, when the UE may be scheduled to receive PDSCHs from CORESETs associated with the at least two DCIs. Similarly, the UE may determine, based on a fifth predetermined rule of the one or more predetermined rules, when the UE may be scheduled to transmit PUSCHs from CORESETs associated with the at least two DCIs.

In some embodiments, the fourth predetermined rule may include at least one of:

when the UE is scheduled to start receiving a first PDSCH starting in symbol j by a PDCCH ending in symbol i, the UE may not be expected to be scheduled to receive a second PDSCH starting earlier than an end of the first PDSCH with a PDCCH that ends later than symbol i from a second CORESET pool; and/or when the UE is scheduled to start receiving a first PDSCH starting in symbol j by a PDCCH ending in symbol i, the UE may not be expected to be scheduled to receive a second PDSCH starting earlier than a first symbol of the first PDSCH with a PDCCH that ends later than symbol i from a second CORESET pool.

In some embodiments, the fifth predetermined rule may include at least one of:

when the UE is scheduled to start transmitting a first PUSCH starting in symbol j by a PDCCH ending in symbol i, the UE may not be expected to be scheduled to transmit a second PUSCH starting earlier than an end of the first PUSCH with a PDCCH that ends later than symbol i from a second CORESET pool; and/or when the UE is scheduled to start transmitting a first PUSCH starting in symbol j by a PDCCH ending in symbol i, the UE may not be expected to be scheduled to transmit a second PUSCH starting earlier than a first symbol of the first PUSCH with a PDCCH that ends later than symbol i from a second CORESET pool.

In some embodiments, the UE may indicate support of single DCI multi-TRP operation modes 1, 2a, 2b, 3, and 4 independently. In such embodiments, the UE may receive, from the base station, a configuration for a single DCI multi-TRP operation mode the UE has indicated it does not support and operate in a fall back mode.

In some embodiments, for multi-TRP multi-DCI based ultra reliable low latency communication (URLLC), the UE may receive multiple PDSCHs with a common HARQ process ID overlapping in time. In some embodiments, for multi-TRP multi-DCI based URLLC, the UE may be scheduled to receive a second PDSCH with a HARQ process ID common to a first PDSCH prior to transmission of an ACK/NACK associated with the first PDSCH.

In some embodiments, the UE may indicate that it does not support 2 pre-coding matrix indexes (PMIs) sub-bands per channel quality indicator (CQI) sub-band for less than 20 PMI sub-bands.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
receiving, from a base station, a configuration to indicate one or more control resource set (CORESET) pools for one or more physical downlink control channels (PDCCHs), wherein each CORESET pool is associated with an index value;
receiving a first PDCCH of the one or more PDCCHs ending at a first symbol and scheduling a first physical uplink shared channel (PUSCH);
receiving a second PDCCH of the one or more PDCCHs ending at a second symbol later than the first symbol and scheduling a second PUSCH; and
determining that the second PUSCH starts on a symbol earlier than the last symbol of the first PUSCH when the first PDCCH and the second PDCCH are associated with different CORESET pool index values.

2. The method of claim 1,
wherein the first PUSCH and the second PUSCH do not overlap in time.

3. The method of claim 1,
wherein said determining is for any two hybrid automatic repeat request (HARQ) process identifiers (IDs) in a given scheduled cell.

4. The method of claim 1, further comprising:
transmitting the first PUSCH, wherein the first PUSCH ends at a third symbol; and
transmitting the second PUSCH, wherein the second PUSCH starts at a fourth symbol occurring earlier than the third symbol.

5. The method of claim 1, further comprising:
monitoring, for each CORESET pool of the one or more CORESET pools, one unicast downlink transmission and one unicast uplink transmission per slot per scheduled component carrier per CORESET pool.

6. A non-transitory computer readable memory medium storing program instructions executable by a processor to cause a device to:
receive, from a base station, a configuration to indicate one or more control resource set (CORESET) pools for one or more downlink control informations (DCIs), wherein each CORESET pool is associated with an index value;
receive a first DCI of the one or more DCIs ending at a first symbol and scheduling a first physical uplink shared channel (PUSCH);
receive a second DCI of the one or more DCIs ending at a second symbol later than the first symbol and scheduling a second PUSCH; and
determine that the second PUSCH starts on a symbol earlier than the last symbol of the first PUSCH when the first DCI and the second DCI are associated with different CORESET pool index values.

7. The non-transitory computer readable memory medium of claim 6,
wherein the first PUSCH and the second PUSCH do not overlap in time.

8. The non-transitory computer readable memory medium of claim 6,
wherein said determining is for any two hybrid automatic repeat request (HARQ) process identifiers (IDs) in a given scheduled cell.

9. The non-transitory computer readable memory medium of claim 6,
wherein the program instructions are further executable to cause the device to:
transmit the first PUSCH, wherein the first PUSCH ends at a third symbol; and
transmit the second PUSCH, wherein the second PUSCH starts at a fourth symbol occurring earlier than the third symbol.

10. The non-transitory computer readable memory medium of claim 6,
wherein the program instructions are further executable to cause the device to:
monitor, for each CORESET pool of the one or more CORESET pools, one unicast downlink transmission and one unicast uplink transmission per slot per scheduled component carrier per CORESET pool.

11. A method, comprising:
transmitting, to a user equipment device (UE), a configuration including one or more control resource set (CORESET) pools for one or more physical downlink control channels (PDCCHs), wherein each CORESET pool is associated with an index value;
transmitting a first PDCCH of the one or more PDCCHs that ends at a first symbol and schedules a first physical uplink shared channel (PUSCH);
transmitting a second PDCCH of the one or more PDCCHs that ends at a second symbol later than the first symbol and schedules a second PUSCH, wherein the first PDCCH and the second PDCCH are associated with different CORESET pool index values;
receiving the first PUSCH ending at a third symbol; and
receiving the second PUSCH starting at a fourth symbol occurring earlier than the third symbol.

12. The method of claim 11, further comprising:
receiving, from the UE, an indication that two pre-coding matrix index (PMI) sub-bands per channel quality indicator (CQI) sub-band for less than twenty PMI sub-bands is not supported.

13. The method of claim 11,
wherein, in a common slot, for a physical downlink shared channel (PDSCH) scheduled by a CORESET pool of the one or more CORESET pools, acknowledgements/negative acknowledgements (ACK/NACKs) can have any time relationship.

14. The method of claim 11,
wherein, in a common slot, for a physical downlink shared channel (PDSCH) scheduled by a CORESET pool of the one or more CORESET pools, a CORESET pool having a non-zero index value cannot schedule an acknowledgements/negative acknowledgements (ACK/NACKs) earlier than a slot scheduled by a CORESET pool having an index value of 0.

15. The method of claim 11, further comprising:
transmitting, for multi-TRP multi-DCI based ultra reliable low latency communication (URLLC), multiple PDSCHs with a common HARQ ID overlapping in time.

16. An apparatus, comprising:
a memory; and
at least one processor in communication with the memory and configured to:
generate a message to transmit, to a user equipment device (UE), a configuration including one or more control resource set (CORESET) pools for one or more physical downlink control channels (PDCCHs), wherein each CORESET pool is associated with an index value;
generate instructions to transmit a first PDCCH of the one or more PDCCHs that ends at a first symbol and schedules a first physical uplink shared channel (PUSCH);
generate instructions to transmit a second PDCCH of the one or more PDCCHs that ends at a second symbol later than the first symbol and schedules a second PUSCH, wherein the first PDCCH and the second PDCCH are associated with different CORESET pool index values;
receive the first PUSCH ending at a third symbol; and
receive the second PUSCH starting at a fourth symbol occurring earlier than the third symbol.

17. The apparatus of claim 16,
wherein the at least one processor is further configured to:
receive, from the UE, an indication that two pre-coding matrix index (PMI) sub-bands per channel quality indicator (CQI) sub-band for less than twenty PMI sub-bands is not supported.

18. The apparatus of claim 16,
wherein, in a common slot, for a physical downlink shared channel (PDSCH) scheduled by a CORESET pool of the one or more CORESET pools, acknowledgements/negative acknowledgements (ACK/NACKs) can have any time relationship.

19. The apparatus of claim 16,
wherein, in a common slot, for a physical downlink shared channel (PDSCH) scheduled by a CORESET pool of the one or more CORESET pools, a CORESET pool having a non-zero index value cannot schedule an acknowledgements/negative acknowledgements (ACK/NACKs) earlier than a slot scheduled by a CORESET pool having an index value of 0.

20. The apparatus of claim 16,
wherein the at least one processor is further configured to:
generate instructions to transmit, for multi-TRP multi-DCI based ultra reliable low latency communication (URLLC), multiple PDSCHs with a common HARQ ID overlapping in time.

* * * * *